(12) United States Patent
Li

(10) Patent No.: US 12,320,989 B2
(45) Date of Patent: Jun. 3, 2025

(54) METHOD OF CONICAL ANISOTROPIC RIGOROUS COUPLED WAVE ANALYSIS FOR GRATING AND COMPUTING DEVICE

(71) Applicant: Goertek Inc., Shandong (CN)

(72) Inventor: Lingshan Li, San Jose, CA (US)

(73) Assignee: Goertek Inc., Shandong (CN)

( * ) Notice: Subject to any disclaimer, the term of this patent is extended or adjusted under 35 U.S.C. 154(b) by 568 days.

(21) Appl. No.: 17/666,717

(22) Filed: Feb. 8, 2022

(65) Prior Publication Data

US 2023/0251500 A1 Aug. 10, 2023

(51) Int. Cl.
*G02B 27/44* (2006.01)
*G02B 5/18* (2006.01)
(Continued)

(52) U.S. Cl.
CPC ........... *G02B 27/44* (2013.01); *G02B 5/1814* (2013.01); *G02B 5/1842* (2013.01);
(Continued)

(58) Field of Classification Search
CPC .............. G02B 27/0012; G02B 5/1833; G02B 5/1866; G02B 5/3025; G02B 5/3083;
(Continued)

(56) References Cited

U.S. PATENT DOCUMENTS 6,950,173 B1 *  9/2005  Sutherland .......... G02F 1/13342
                                                              430/1
7,454,103 B2 * 11/2008  Parriaux ................ G02B 6/124
                                                              385/37
(Continued)

FOREIGN PATENT DOCUMENTS

CN   112099228 A  * 12/2020  ......... G02B 27/0012
EP   3 180 647 B1   11/2019

OTHER PUBLICATIONS

The Finite Difference Time Domain Method for Electromagnetics by Kunz KS, Luebbers RJ in CRC press; 1993; pp. 30-49.
"Computational electromagnetics: the finite-difference time-domain method" by Taflove A, Hagness SC, Piket-May M in Electr Eng Handb. 2005; pp. 51-61.
(Continued)

*Primary Examiner* — Arnel C Lavarias
(74) *Attorney, Agent, or Firm* — Baker Botts LLP

(57) ABSTRACT

A method of conical anisotropic rigorous coupled wave analysis for grating and a computing device are disclosed. The method includes: obtaining a target geometric phase $\delta'_g$ for the anisotropic-material-based grating; obtaining a slow axis azimuth angle $\phi_c(x)$ of the anisotropic-material-based grating according to the target geometric phase $\delta'_g$; obtaining a permittivity tensor of the anisotropic-material-based grating, wherein the anisotropic-material-based grating has an ordinary index $n_o$ and an extraordinary index $n_e$, the anisotropic-material-based grating has a slow axis polar angle $\theta_c$ and slow axis azimuth angle $\phi_c(x)$, and the permittivity tensor is based on $n_o$, $n_e$, $\theta_c$ and $\phi_c(x)$; applying the permittivity tensor into Maxwell equations; obtaining electromagnetic field for the anisotropic-material-based grating by using boundary conditions of at least two layers or sublayers of the anisotropic-material-based grating to obtain a diffraction efficiency for the anisotropic-material-based grating.

7 Claims, 12 Drawing Sheets

(51) Int. Cl.
*G02B 27/01* (2006.01)
*G02B 27/42* (2006.01)
*G06F 17/11* (2006.01)

(52) U.S. Cl.
CPC ..... *G02B 27/0101* (2013.01); *G02B 27/0172* (2013.01); *G02B 27/4205* (2013.01); *G02B 27/4266* (2013.01); *G06F 17/11* (2013.01)

(58) Field of Classification Search
CPC ........ G02B 27/4205; G02B 1/08; G02B 5/18; G02B 2005/1804; G02B 5/1814; G02B 5/1828; G02B 5/1871; G02B 5/30; G02B 5/3016; G02B 5/32; G02B 26/08; G02B 26/0808; G02B 27/106; G02B 27/1086; G02B 27/28; G02B 27/283; G02B 27/286; G02B 27/42; G02B 27/4272; G02F 1/133528; G02F 1/133531; G02F 1/133538; G02F 1/133541
USPC ..... 359/486.01, 573, 558, 566, 569, 483.01, 359/485.05, 487.03, 489.01, 489.06, 359/489.07, 489.08, 489.09, 489.15, 359/489.16; 349/1, 18, 193, 201, 202; 362/19; 353/20
See application file for complete search history.

(56) References Cited

U.S. PATENT DOCUMENTS

| | | |
|---|---|---|
| 9,465,215 B2 | 10/2016 | Richards et al. |
| 9,551,880 B2 | 1/2017 | Amitai |
| 11,048,087 B2 | 6/2021 | Wheelwright et al. |
| 2021/0055554 A1 | 2/2021 | Chi et al. |

OTHER PUBLICATIONS

Modal theory of spatially periodic media by Chu R-S, Kong JA in IEEE Trans Microw Theory Tech. 1977;25(1):18-24.
Interpretation of MIMO channel characteristics in rectangular tunnels from modal theory by Molina-Garcia-Pardo JM, Lienard M, Degauque P, Dudley DG, Juan-Llacer L in IEEE, Trans. Veh. Technol., 2008:57 (3) :1974-1979.
"The dielectric lamellar diffraction grating" by Botten IC, Craig MS, McPhedran RC, Adams JL, Andrewartha J in Opt Acta Int J Opt. 1981;28(3):413-428.
"The finitely conducting lamellar diffraction grating" by Botten LC, Craig MS, McPhedran RC, Adams JL, Andrewartha JR in Opt Acta Int J Opt. 1981;28(8):1087-1102.
"Modal theory of diffraction by multilayered gratings containing dielectric and metallic components" by Jiang M, Tamir T, Zhang S in JOSA A. 2001;18(4):807-820.
"Coupled Wave Theory for Thick Hologram Gratings" by Kogelnik H . . . Bell Syst Tech J in 1969;48(9):2909-2947. doi:10.1002/j.1538-7305.1969.tb01198.x.
"Rigorous coupled-wave analysis of planar-grating diffraction" by Moharam MG, Gaylord TK in J Opt Soc Am. 1981;71(7):811. doi:10.1364/JOSA.71.000811.
Coupled-wave theory for multiply exposed thick holographic gratings by Case SK in JOSA. 1975;65(6):724-729.
"Rigorous coupled-wave analysis of grating diffraction—E-mode polarization and losses" by Moharam MG, Gaylord TK . . . JOSA. 1983;73(4):451-455.
"Two-dimensional coupled wave theory for square-lattice photonic-crystal lasers with TM-polarization" by Sakai K, Miyai E, Noda S in Opt Express. 2007;15(7):3981-3990.
"Rigorous coupled-wave analysis and applications of grating diffraction" by Glytsis EN, Gaylord TK, Brundrett DL in Diffractive Miniaturized Opt A Crit Rev. 1993;10271(1992).
"Formulation for stable and efficient implementation of the rigorous coupled-wave analysis of binary gratings" by Grann EB, Pommet D a., Moharam MG, Gaylord TK in J Opt Soc Am, A, 1995; 12 (5) :1068-1076.
"Three-dimensional (vector) rigorous coupled-wave analysis of anisotropic grating diffraction" by Glytsis EN, Gaylord TK in J Opt Soc Am A. 1990;7(8):1399. doi:10.1364/josaa.7.
"Stable implementation of the rigorous coupled-wave analysis for surface-relief gratings: enhanced transmittance matrix approach" by Moharam MG, Gaylord TK, Pommet DA, Grann EB, in J. Opt. Soc. Am, A, 1995; 12 (5) :1077.
"Reflective polarization vol. gratings for high efficiency waveguide-coupling augmented reality displays" by Lee Y-H, Yin K, Wu S-T in Opt Express. 2017;25(22):27008-27014.
"Bragg polarization gratings for wide angular bandwidth and high efficiency at steep deflection angles" by Xiang X, Kim J, Escuti MJ in Sci Rep. 2018;8(1):1-6.
"Computational Methods for Electromagnetic and Optical Systems" by Jarem JM, Banerjee PP in CRC press; 2016.
"Stable implementation of the rigorous coupled-wave analysis for surface-relief gratings enhanced transmittance matrix approach" by Moharam MG, Pommet DA, Grann EB in 1995.
"Numerical analysis of Bragg regime polarization gratings by rigorous coupled-wave analysis" by Xiang X, Escuti MJ in Pract Hologr XXXI Mater Appl. 2017;10127(Apr. 2017):1012.
"Color-selective geometric phase lens for apochromatic lens system" by Li L, Kim J, Shi S, Escuti MJ in In: Khoo IC, ed. Liquid Crystals XXIV. vol 11472. SPIE; 2020:38-51.
Color-selective geometric-phase lenses for focusing and imaging based on liquid crystal polymer films by Lingshan Li, Shuojia Shi, Jihwan Kim, and Michael. J. Escuti, in Opt., Express 30, 2478-2502 (2022).

* cited by examiner

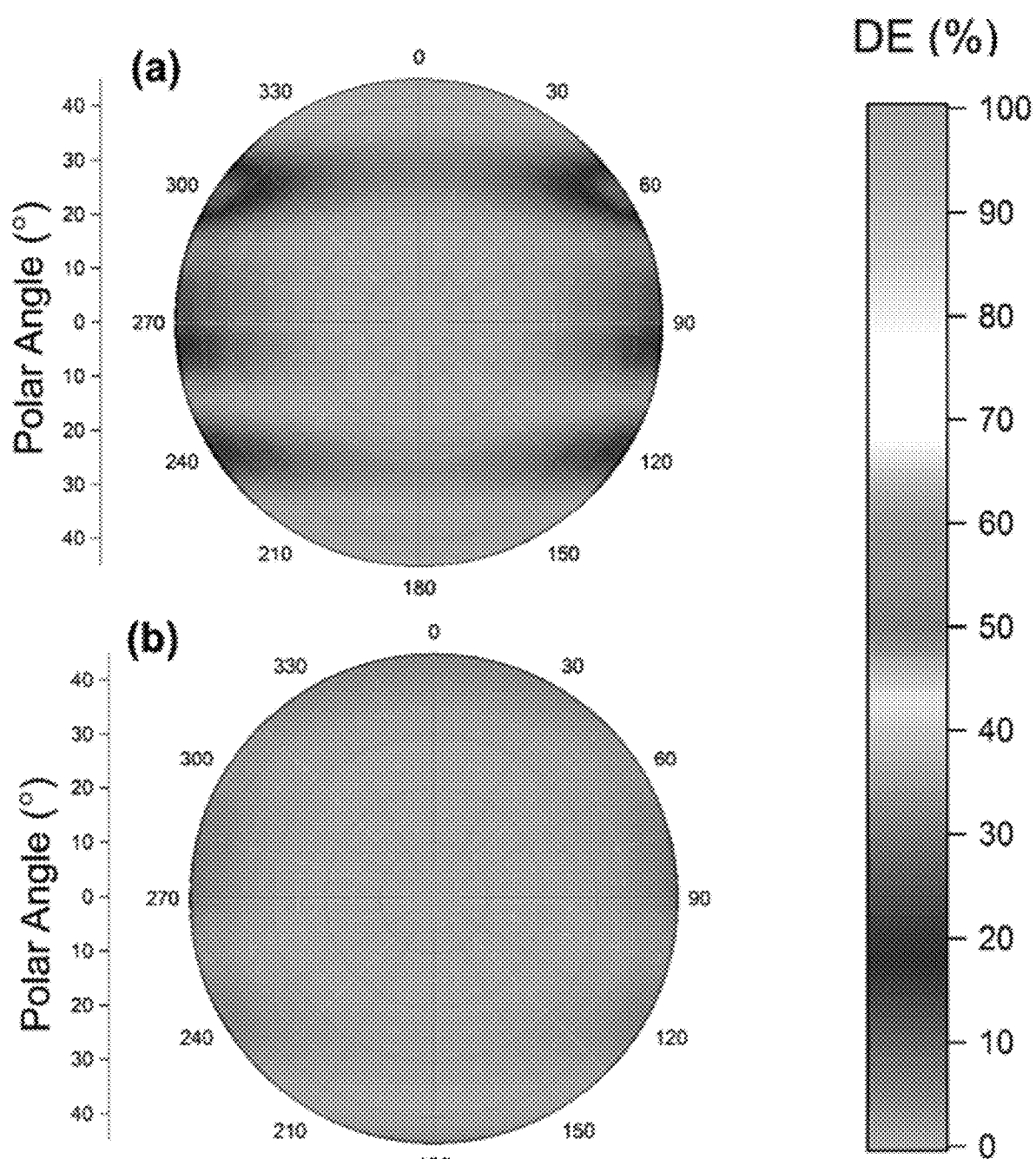
FIG. 5(to be continued)

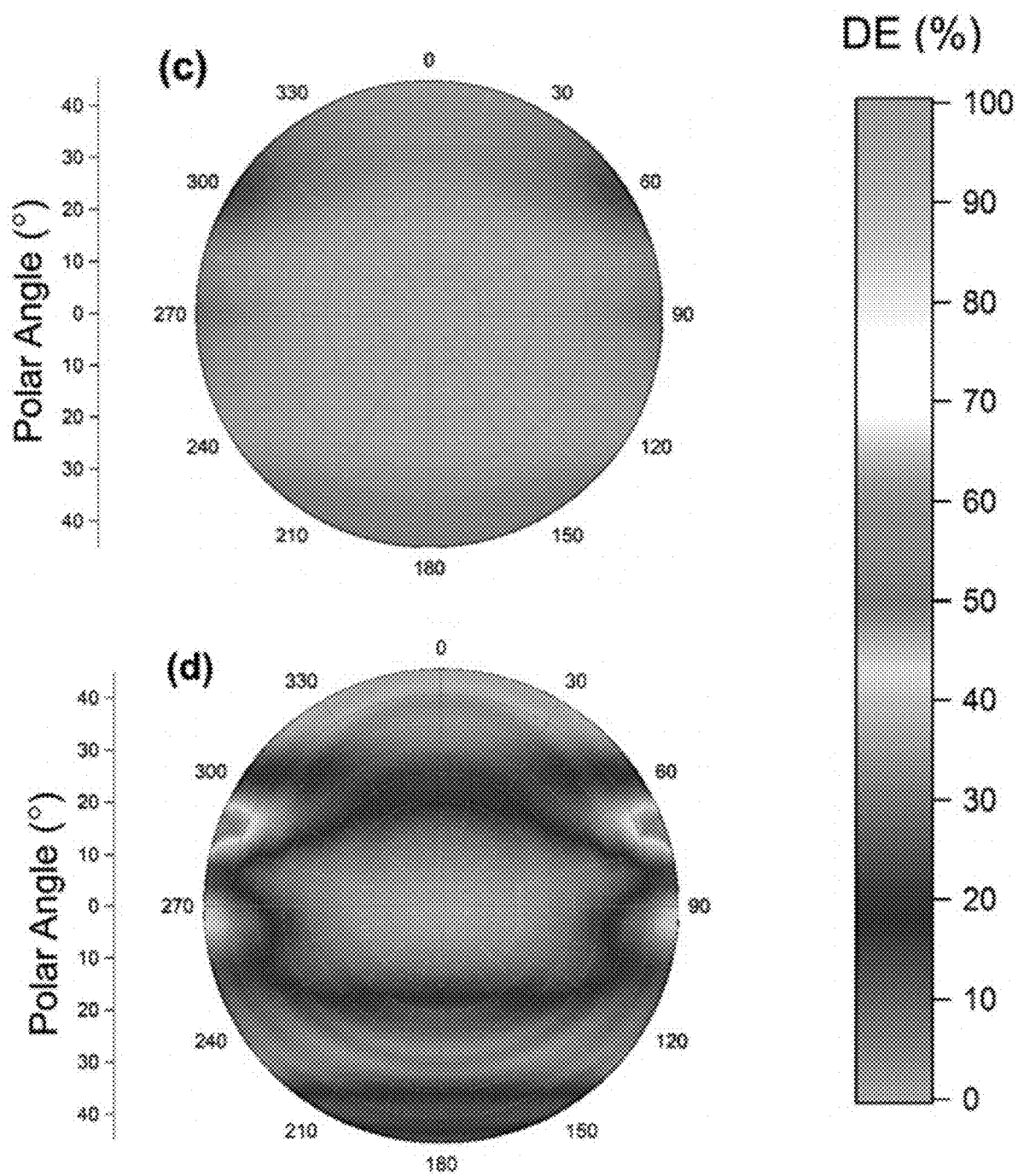
FIG. 5(to be continued)

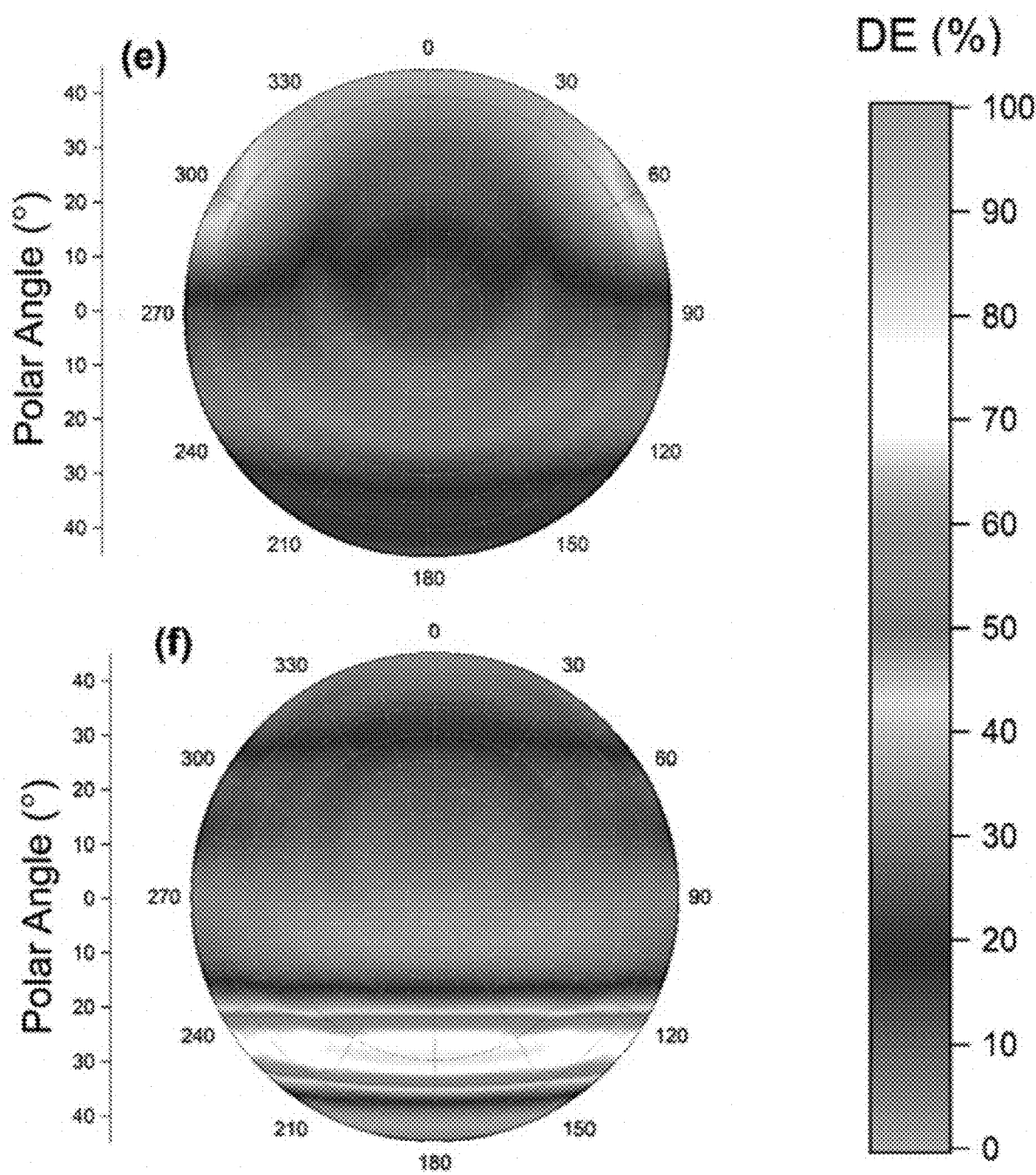
FIG. 5(to be continued)

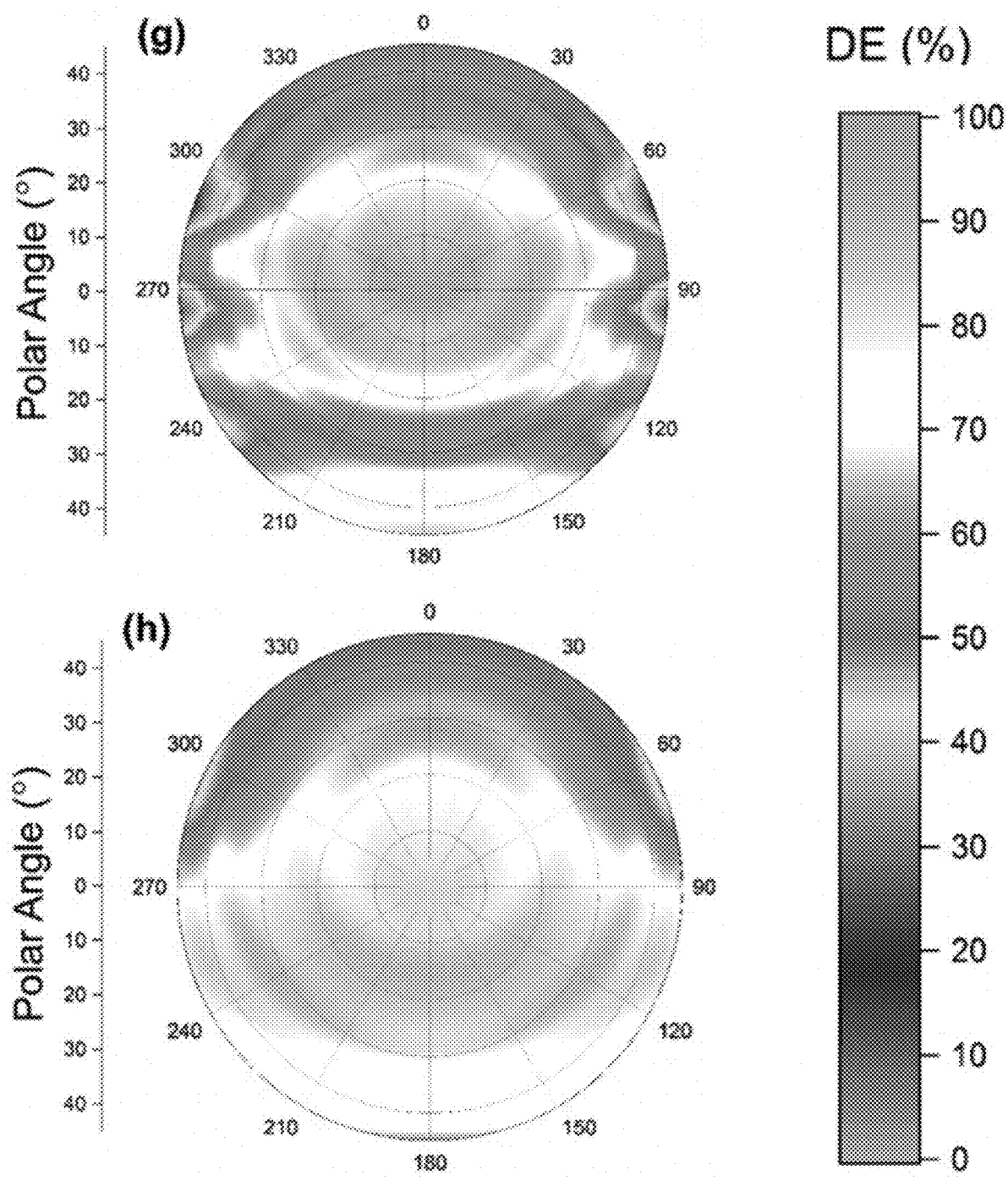
FIG. 5(to be continued)

METHOD OF CONICAL ANISOTROPIC RIGOROUS COUPLED WAVE ANALYSIS FOR GRATING AND COMPUTING DEVICE

FIELD OF THE INVENTION

This disclosure relates to the technical field of analysis and design of1 anisotropic-material-based grating, and more specifically, to a method of obtaining a diffraction efficiency of an anisotropic-material-based grating, a method for obtain parameters of an anisotropic-material-based grating and a computing device.

BACKGROUND OF THE INVENTION

In the next-generation displays such as augmented reality (AR), rays from the displays incident on an input coupler grating (ICG) are diffracted by the ICG, undergo total internal reflection (TIR) within the waveguide (WG), and are finally diffracted out of the WG by an output coupler grating (OCG).

The article of "The Finite Difference Time Domain Method for Electromagnetics" by Kunz K S, Luebbers R J in CRC press; 1993 discloses a finite difference time domain method, which is hereby incorporated in its whole by reference.

The article of "Computational electromagnetics: the finite-difference time-domain method" by Taflove A, Hagness S C, Piket-May M in Electr Eng Handb. 2005; 3 discloses a finite-difference time-domain method, which is hereby incorporated in its whole by reference.

The article of "Modal theory of spatially periodic media" by Chu R-S, Kong J A in IEEE Trans Microw Theory Tech. 1977; 25(1):18-24 discloses a modal theory of spatially periodic media, which is hereby incorporated in its whole by reference.

The article of "Interpretation of MIMO channel characteristics in rectangular tunnels from modal theory" by Molina-Garcia-Pardo J M, Lienard M, Degauque P, Dudley D G, Juan-Llacer L in IEEE Trans Veh Technol. 2008; 57(3):1974-1979 discloses an interpretation of MIMO channel characteristics in rectangular tunnels from modal theory, which is hereby incorporated in its whole by reference.

The article of "The dielectric lamellar diffraction grating" by Botten I C, Craig M S, McPhedran R C, Adams J L, Andrewartha J in Opt Acta Int J Opt. 1981; 28(3):413-428 discloses a dielectric lamellar diffraction grating, which is hereby incorporated in its whole by reference.

The article of "The finitely conducting lamellar diffraction grating" by Botten L C, Craig M S, McPhedran R C, Adams J L, Andrewartha J R in Opt Acta int J Opt. 1981; 28(8): 1087-1102 discloses a finitely conducting lamellar diffraction gratin, which is hereby incorporated in its whole by reference.

The article of "Modal theory of diffraction by multilayered gratings containing dielectric and metallic components" by Jiang M, Tamir T, Zhang S in JOSA A. 2001; 18(4):807-820 discloses a modal theory of diffraction by multilayered gratings containing dielectric and metallic components, which is hereby incorporated in its whole by reference.

The article of "Coupled Wave Theory for Thick Hologram Gratings" by Kogelnik H. Bell Syst Tech J in 1969; 48(9): 2909-2947. doi:10.1002/j.1538-7305.1969.tb01198.x discloses a coupled wave theory for thick hologram gratings, which is hereby incorporated in its whole by reference.

The article of "Image storage and reconstruction in volume holography" by Bergstein L, Kennisch D in Mod Opt. Published online 1967:655 discloses an image storage and reconstruction in volume holography, which is hereby incorporated in its whole by reference.

The article of "Rigorous coupled-wave analysis of planar-grating diffraction" by Moharam M G, Gaylord T K in J Opt Soc Am. 1981; 71(7):811. doi:10.1364/JOSA.71.000811 discloses a rigorous coupled-wave analysis of planar-grating diffraction, which is hereby incorporated in its whole by reference.

The article of "Coupled-wave theory for multiply exposed thick holographic gratings" by Case S K in JOSA. 1975; 65(6):724-729 discloses a coupled-wave theory for multiply exposed thick holographic gratings, which is hereby incorporated in its whole by reference.

The article of "Rigorous coupled-wave analysis of grating diffraction—E-mode polarization and losses" by Moharam M G, Gaylord T K. JOSA. 1983; 73(4):451-455. Discloses a rigorous coupled-wave analysis of grating diffraction, which is hereby incorporated in its whole by reference.

The article of "Two-dimensional coupled wave theory for square-lattice photonic-crystal lasers with TM-polarization" by Sakai K, Miyai E, Noda S in Opt Express. 2007; 15(7):3981-3990 discloses a two-dimensional coupled wave theory for square-lattice photonic-crystal lasers with TM-polarization, which is hereby incorporated in its whole by reference.

The article of "Formulation for stable and efficient implementation of the rigorous coupled-wave analysis of binary gratings" by Grann E B, Pommet D a., Moharam M G, Gaylord T K in J Opt Soc Am A. 1995; 12(5):1068-1076. discloses a formulation for stable and efficient implementation of the rigorous coupled-wave analysis of binary gratings, which is hereby incorporated in its whole by reference.

The article of "Three-dimensional (vector) rigorous coupled-wave analysis of anisotropic grating diffraction" by Glytsis E N, Gaylord T K in J Opt Soc Am A. 1990; 7(8):1399. doi:10.1364/josaa.7.001399 discloses a three-dimensional (vector) rigorous coupled-wave analysis of anisotropic grating diffraction, which is hereby incorporated in its whole by reference.

The article of "Rigorous coupled-wave analysis and applications of grating diffraction" by Glytsis E N, Gaylord T K, Brundrett D L in Diffractive Miniaturized Opt A Crit Rev. 1993; 10271(1992):1027102. doi:10.1117/12.170183 discloses a rigorous coupled-wave analysis and applications of grating diffraction, which is hereby incorporated in its whole by reference.

The article of "Stable implementation of the rigorous coupled-wave analysis for surface-relief gratings: enhanced transmittance matrix approach" by Moharam M G, Gaylord T K, Pommet D A, Grann E B in J Opt Soc Am A. 1995; 12(5):1077. doi:10.1364/JOSAA.12.001077 discloses a stable implementation of the rigorous coupled-wave analysis for surface-relief gratings, which is hereby incorporated in its whole by reference.

The article of "Spatially multiplexed volume bragg gratings with varied refractive index modulations for waveguide display" by Chi W, Meiser D, Yang Y, Lam W S T, Saarikko P, Huang N published online in 2021 discloses spatially multiplexed volume bragg gratings with varied refractive index modulations for waveguide display, which is hereby incorporated in its whole by reference.

The article of "Polarizing optical system" by Amitai Y published online in 2017 discloses a polarizing optical system, which is hereby incorporated in its whole by reference.

The article of "Optical assemblies having polarization volume gratings for projecting augmented reality content" by Wheelwright B, Lee Y-H, Amirsolaimani B, Weichuan G A O published online in 2021 discloses optical assemblies having polarization volume gratings for projecting augmented reality content, which is hereby incorporated in its whole by reference.

The article of "Reflective polarization volume gratings for high efficiency waveguide-coupling augmented reality displays" by Lee Y-H, Yin K, Wu S-T in Opt Express. 2017; 25(22):27008-27014 discloses reflective polarization volume gratings for high efficiency waveguide-coupling augmented reality displays, which is hereby incorporated in its whole by reference.

The article of "Bragg polarization gratings for wide angular bandwidth and high efficiency at steep deflection angles" by Xiang X, Kim J, Escuti M J in Sci Rep. 2018; 8(1):1-6 discloses Bragg polarization gratings for wide angular bandwidth and high efficiency at steep deflection angles, which is hereby incorporated in its whole by reference.

The article of "Waveguide eye tracking employing volume Bragg grating" by Robbins S, Nguyen I A, Lou X published online in 2016 discloses a waveguide eye tracking employing volume Bragg grating, which is hereby incorporated in its whole by reference.

The article of "Lightguide with multiple in-coupling holograms for head wearable display" by Richards E M, Perreault J D published online in 2016 discloses a lightguide with multiple in-coupling holograms for head wearable display, which is hereby incorporated in its whole by reference.

The article of "Computational Methods for Electromagnetic and Optical Systems" by Jarem J M, Banerjee P P in CRC press; 2016 discloses computational methods for electromagnetic and optical systems, which is hereby incorporated in its whole by reference.

The article of "Stable implementation of the rigorous coupled-wave analysis for surface-relief gratings enhanced transmittance matrix approach" by Moharam M G, Pommet D A, Grann E B in 1995; 12(5):1077-1086 discloses a stable implementation of the rigorous coupled-wave analysis for surface-relief gratings enhanced transmittance matrix approach, which is hereby incorporated in its whole by reference.

The article of "Numerical analysis of Bragg regime polarization gratings by rigorous coupled-wave analysis" by Xiang X, Escuti M J in Pract Hologr XXXI Mater Appl. 2017; 10127 (April 2017):101270D. doi:10.1117/12.2258529 discloses a numerical analysis of Bragg regime polarization gratings by rigorous coupled-wave analysis, which is hereby incorporated in its whole by reference.

The article of "Color-selective geometric phase lens for apochromatic lens system" by Li L, Kim J, Shi S, Escuti M J in: Khoo I C, ed. Liquid Crystals XXIV. Vol 11472. SPIE; 2020:38-51. doi:10.1117/12.2569165 discloses color-selective geometric phase lens for apochromatic lens system, which is hereby incorporated in its whole by reference.

The article of "Liquid crystal polymer based color-selective geometric phase lens for focusing and imaging" by Li L, Shi S, Jihwan; K, Escuti M J in Opt Express. 2021; submitted discloses liquid crystal polymer based color-selective geometric phase lens for focusing and imaging, which is hereby incorporated in its whole by reference.

The article of "Color-selective geometric-phase lenses for focusing and imaging based on liquid crystal polymer films" by Lingshan Li, Shuojia Shi, Jihwan Kim, and Michael. J. Escuti, in Opt. Express 30, 2487-2502 (2022) discloses color-selective geometric-phase lenses for focusing and imaging based on liquid crystal polymer films, which is hereby incorporated in its whole by reference.

SUMMARY OF THE INVENTION

One object of this disclosure is to provide a new technical solution for obtaining a diffraction efficiency of an anisotropic-material-based grating.

According to a first aspect of the present disclosure, there is provided a method of obtaining a diffraction efficiency of an anisotropic-material-based grating, comprising: obtaining a target geometric phase $\delta'_g$ for the anisotropic-material-based grating; obtaining a slow axis azimuth angle $\phi_c(x)$ of the anisotropic-material-based grating according to the target geometric phase $\delta'_g$; obtaining a permittivity tensor of the anisotropic-material-based grating, wherein the anisotropic-material-based grating has an ordinary index $n_o$ and an extraordinary index $n_e$, the anisotropic-material-based grating has a slow axis polar angle $\theta_c$ and slow axis azimuth angle $\phi_c(x)$, and the permittivity tensor is based on $n_o$, $n_e$, $\theta_c$ and $\phi_c(x)$; applying the permittivity tensor into Maxwell equations; obtaining electromagnetic field for the anisotropic-material-based grating by using boundary conditions of at least two layers or sublayers of the anisotropic-material-based grating and Maxwell equations for each layer or sublayer, to obtain a diffraction efficiency for the anisotropic-material-based grating.

According to a second aspect of the present disclosure, there is provided a method of obtaining parameters of an anisotropic-material-based grating, comprising: obtaining diffraction efficiencies of different anisotropic-material-based gratings by using the method according to an embodiment; obtaining a merit function involving a diffraction efficiency for an anisotropic-material-based grating; obtaining a desired anisotropic-material-based grating based on the merit function using the diffraction efficiencies of different anisotropic-material-based gratings; and obtaining parameters of the desired anisotropic-material-based grating.

According to a third aspect of the present disclosure, there is provided a computing device, comprising a memory and a processing unit, wherein the memory includes executable instructions, when the executable instructions are executed by the processing unit, the processing unit is made to implement the processes of the method according to an embodiment.

According to an embodiment of this disclosure, a new solution of conical anisotropic Rigorous Coupled Wave Analysis is provided for an anisotropic-material-based grating.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Figure 1:
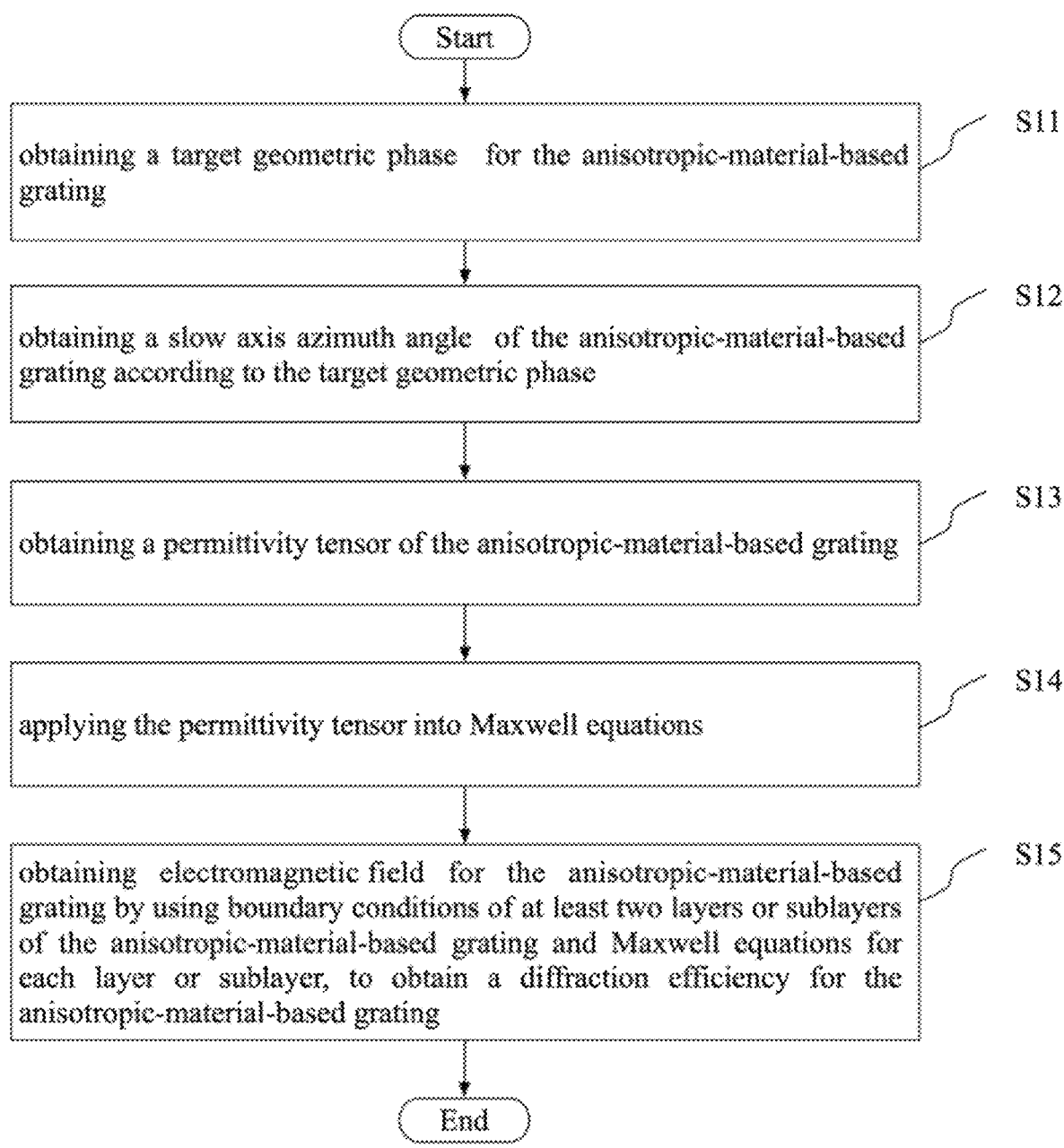
FIG. 1 shows a schematic flow chart of a method of obtaining a diffraction efficiency of an anisotropic-material-based grating according to an embodiment of this disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 shows a schematic flow chart of a method of obtaining a diffraction efficiency of an anisotropic-material-based grating according to an embodiment of this disclosure.

As shown in FIG. 1, at step S11, a target geometric phase $\delta'_g$ for the anisotropic-material-based grating is obtained.

At step S12, a slow axis azimuth angle $\phi_c(x)$ of the anisotropic-material-based grating is obtained according to the target geometric phase $\delta'_g$.

At step S13, a permittivity tensor of the anisotropic-material-based grating is obtained. The anisotropic-material-based grating has an ordinary index $n_o$ and an extraordinary index $n_e$, the anisotropic-material-based grating has a slow axis polar angle $\theta_c$ and slow axis azimuth angle $\phi_c(x)$, and the permittivity tensor is based on $n_o$, $n_e$, $\theta_c$ and $\phi_c(x)$.

At step S14, the permittivity tensor is applied into Maxwell equations.

At step S15, electromagnetic field for the anisotropic-material-based grating is obtained by using boundary conditions of at least two layers or sublayers of the anisotropic-material-based grating and Maxwell equations for each layer or sublayer, to obtain a diffraction efficiency for the anisotropic-material-based grating.

This method uses a permittivity tensor of an anisotropic anisotropic-material-based grating and uses boundary conditions for at least two layers, and thus it can achieve a conical anisotropic rigorous coupled wave analysis. This solution can be applied to a grating of anisotropic material with multiple layers and sublayers and can provide a much more precise electromagnetic field result for a grating.

It shall be understood by a person in the art that Maxwell equations and boundary conditions are basic concept and will not be explained in detail here.

For example, step S15 may further include:

obtaining a matrix $F_1$ for a first layer or sublayer of the anisotropic-material-based grating by using a first boundary condition between the first layer or sublayer and a region 1 through a first equation as below:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix}\begin{bmatrix} R_s \\ R_p \end{bmatrix} = F_1 \cdot C$$

obtaining a matrix $F_L$ for a final layer or sublayer of the anisotropic-material-based grating by using a last boundary condition between the final layer or sublayer and a region 3 through a second equation as below:

$$F_L \cdot C = \begin{bmatrix} I & 0 \\ -jY_{II} & 0 \\ 0 & I \\ 0 & -jZ_{II} \end{bmatrix}\begin{bmatrix} T_s \\ T_p \end{bmatrix};$$

obtaining respective matrix $F_l$ of lth layer or sublayer by using respective boundary condition between adjacent layers or sublayers according to an iteration equation as below:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix}\begin{bmatrix} R_s \\ R_p \end{bmatrix} =$$

$$\prod_{l=1}^{L} F_l \cdot (F_l')^{-1} \begin{bmatrix} I & 0 \\ -jY_{II} & 0 \\ 0 & I \\ 0 & -jZ_{II} \end{bmatrix}\begin{bmatrix} T_s \\ T_p \end{bmatrix};$$

and obtaining electromagnetic field for the anisotropic-material-based grating by using boundary conditions obtained through the first, second iteration equations.

Here, region 1 is an input region for the anisotropic-material-based grating and region 3 is an output region for the anisotropic-material-based grating. A total layer or sublayer number of the anisotropic-material-based grating is L. Matrix $F_l$ represents a matrix function of lth layer or sublayer of the anisotropic-material-based grating, where l=1 ... L, which can include or is derived from part or all of the following vectors: diagonal matrix $K_x$, convolution permittivity matrix E, eigenvalue matrix $Q_l$, and eigen matrix $W_l$. The diagonal matrix $K_x$ has i,i element being equal to $k_{xi}/k_0$, $k_0$ is a wavevector $k_0 = \hat{x}k_{x0} + \hat{y}k_{y0} + \hat{z}k_{z0}$ of 0 order, and $k_{xi}$ is coefficient in an wavevector $k_i = \hat{x}k_{xi} + \hat{y}k_{yi} + \hat{z}k_{zi}$ of ith order. The convolution permittivity matrix E is formed by permittivity harmonic components, with i,p element being equals to a permittivity $\in_{(i-p)}$. The eigenvalue matrix $Q_l$ is formed by eigenvalue $q_{l,i,m}$. The eigen matrix $W_l$ is formed by eigenvector $\omega_{l,i,m}$. The Matrix I represents an identity matrix. The matrix C represents constant vector used to reconstruct the linear combination of the eigenvectors. Matrices $Y_I$, $Y_{II}$, $Z_I$, and $Z_{II}$ represent diagonal matrices with diagonal element $(k_{1,zi}/k_0)$, $(k_{2,zi}/k_0)$, $(k_{1,zi}/k_0 n_1^2)$, and $(k_{2,zi}/k_0 n_1^2)$, respectively. $\psi$ is an angle between an electric field vector and a plane of incidence in region 1, $\delta_{i0}$ is a geometric phase in region 1, $n_1$ is an index of the region 1, and $\theta$ is a polar angle of the electric field vector in region 1.

In this embodiment, a novel matrix $F_l$ is proposed to modify and derive the boundary conditions. Through iteration equations, boundary conditions for respective layers can be obtained. As such, it can implement a conical the conical rigorous coupled wave analysis and enhanced transmittance matrix algorithm. This solution embodies the characteristics of layers in a grating, especially, a grating of an isotropic materials, and thus it is based on the solid physics model liquid crystal (LC) material.

For example, the anisotropic-material-based grating is a liquid-crystal-based grating, and the sublayers of the liquid-crystal-based grating is formed through hologram in each layer of the liquid-crystal-based grating.

In an example, the ordinary index $n_o$ and the extraordinary index $n_e$ vary with a wave length of an incident light. As such, this method can be used to perform analysis involving a color dispersion.

This method can be used for various gratings. For example, the anisotropic-material-based grating may be a transmissive and/or reflective grating.

Below, embodiments, examples and experiment results will further be explained with reference to FIG. 2 to FIG. 5.

The electromagnetic (EM) field of the all the rays presented within and surrounding a waveguide in an optical display system may be analyzed to implement a precise control of light within the optical display system. Various types of EM field analyses have been proposed, including integral solver such as method of moment (MoM), differential solver such as finite-difference-time-domain (FDTD) and finite-element-method (FEM), and couple-wave-theory (CWT) such as two-wave coupled wave analysis, and rigorous couple wave analysis (RCWA). Compared to FDTD, the RCWA algorithm has a lower computer expanse, and compared to two-wave coupled wave analysis, the RCWA algorithm has a higher precision of including any optional orders of reflection/transmission compared to two-wave coupled wave analysis.

The output coupler grating OCG and input coupler grating ICG of a waveguide can be made of isotropic media such as surface-relief gratings, or anisotropic media such as liquid crystals (LCs). The LC-based gratings have a relatively high diffraction efficiency, low-cost manufacturing, and the possibility of increasing angular/wavelength response of integrating several layers of Bragg volume grating into one stack. So, the present inventor proposes a technical solution of anisotropic RCWA with several layers of different anisotropy and conical diffraction.

Various embodiments provide approaches to embody a real grating structure and thus are based on solid grating models, such as liquid crystal LC grating models, to calculate conical diffractions of a stack of gratings with more than one layer of different anisotropy in three dimensions. The three-dimension physical models of embodiments may have periodic slow axis. The planar diffraction of RCWA is based on the enhanced transmittance matrix (ETM), and the conical diffraction can be obtained. Here, the conical ETM concept is presented and the conical RCWA for several layers of anisotropy in three dimensions result have been validated. From the presented algorithm or mathematical procedure, the incident EM field polarization can be designed, and the conical diffraction of periodic anisotropic media can be calculated according to the input polarization. Both the transmission, reflection of any given order can be calculated and designed. Therefore, this solution is also applicable to calculate the polarization of the output vector.

Besides, since the solution can be based on a rigorous physical LC model, from the material view, the model and the solution can also include the simulation of tilted LC layer, which is usually the defects of the certain type of LC grating. Through solving the respective Maxwell equations (ME) that relate to the tilting element, the influence of the diffraction of the grating effect can be evaluated.

In addition, since the embodiments include rigorous approaches of solving Maxwell equations, the EM fields within or out of the gratings can also be calculated by adding different orders of transmissions and reflections together at a specific location.

The conical RCWA solutions based on enhanced transmittance matrix ETM in various embodiments are novel procedures that obtain the EM field of an anisotropic periodic media in three dimensions. The solutions can be applied to liquid crystal materials, and can also be applied to other types of materials, such as uniaxial/biaxial anisotropic media. Solutions in various embodiments can use Maxwell equations for each layer/sublayer and connect the boundary conditions of respective layers/sublayer. to determine the characteristics of a grating. Therefore, A rigorous procedure is proposed to include the material information such as the permittivity matrix in three dimensions, which is used to describe the anisotropic phenomenon of a material.

As various solutions in this disclosure can be based on the enhanced transmittance matrix ETM, it can include one or more different anisotropic mapping of three-dimension profile with arbitrary thickness and chirality in each layer/sublayer. Such chirality is not limited to LC material, but also other anisotropic material, such as nanostructure fabricated by lithography. Therefore, embodiments in this disclosure provide a novel solution to obtain the EM field in three dimensions, i.e. both planar and conical diffraction.

Typically, the integral equation solvers or differential equation solvers can be used to calculate the EM field radiation of an object in a space. In integral equation solver, such as MoM, which solves the linear partial differential equations as boundary integral equations, has been vastly applied to engineering and science field including fluid mechanics, acoustics, and fracture mechanics. The MoM only requires the calculation of the boundary values of EM field, rather than EM field inside the desired space.

In differential equation solvers, the FDTD solution employs the grid-based differential numerical modeling methods (or finite difference methods) and calculate the time-dependent partial differential Maxwell equation of discretized space and time partial derivatives. Using the Yee lattice, the finite-difference MEs can solve the electric field vector component of a volume at a specific instant of time, while the magnetic field is vector component solved at the next instant of time. Such reciprocal EM field is then solved repeatedly until the transient or steady-state EM field is fully solved.

In a finite-element-method solution, the partial differential equations are transferred into equivalent ordinary differential equations, or the time derivatives are eliminated completely. It provides a relatively easy procedure for solving complex domain that has different properties over the entire domain.

For the case of periodic structure such as gratings, the permittivity can be expressed in Fourier series. Two types of theories have been presented, i.e. the modal theory and the coupled-wave theory. Both of these equivalent theories are capable of being formulated rigorously without approximation. The couple-wave theory can give exceptional physical insight into the diffraction phenomenon. The couple-wave theory has the following assumptions. First, the boundary diffraction has been ignored. Second, the second derivatives of the field amplitudes have been ignored. Third, there is only one diffracted wave retained, in addition to the transmitted waves. For the two-wave couple wave theory, only two orders are calculated in the simulation, which provides a clear physical explanation of the grating phenomenon with relatively low computation expense.

The RCWA method herein provides a relatively low-computational expense solution yet maintain high accuracy of the retaining several orders of diffraction. The matrix dimension used in RCWA is determined by the order desired to be calculated, which provides a flexibility by balancing the complexity and accuracy of the calculation. The RCWA method is proved to be able to calculate the both E-mode and H-mode of the planar gratings in both planar and conical scenarios, as well as the cross grating with isotropic and anisotropic media.

For the case of gratings with several non-identical layers of permittivity distribution, the enhanced transmittance matrix is being used to match the boundary condition between the adjacent layers.

For the integral solver such as MoM method, the boundary elements typically give out the fully populated matrix, leading to the much higher computational expense when the problem size grows, compared to the finite element matrices that used in FDTD or FEM. Besides, the MoM method is based on the assumption that the linear homogenous media Green's functions is calculable, which significantly limits the application range of the MoM. The FDTD approach is rigorous but it consumes lots of the computational expense by discretizing both space and time. The FEM method is more suitable for objects with complex details but it requires tremendous huge computational expense by dividing the domain into mesh. As for two-wave couple wave theory, although it can give relatively quick solutions, it suffers errors by ignoring other high order field.

As mention above, the RCWA solution can provide a high-accuracy of EM field calculation with minimal error yet low computational expense compared to the other algorithm. However, the algorithm of RCWA mentioned above only address limited cases such as the multi-layer planar isotropic grating, or single layer isotropic grating conical diffraction. In the scenarios of anisotropic gratings regime, the algorithm of multi-layer conical diffraction of anisotropic gratings has never been investigated.

In order to apply the polarization volume grating (PVG) or polarization Bragg gratings (PBG) into augmented reality (AR)/virtual reality (VR) devices, the solution of obtaining EM characteristics of such structure is desired. Specifically, the PVG or PBG has been widely used in AR waveguide system, due to its high diffraction efficiency and low fabrication cost compared to the nano-imprint surface relief-grating (SRG). To realize a wide-angle, high-resolution and high-luminance virtual image at the user side, the optical system design needs to build a connection with the PVG design parameter, such as material index, thickness and slant angle. In order to design such an optical system, it is proposed herein to present variables as anisotropic material physical properties such as permittivity matrix, birefringence, thickness, and LC twist rate. After building up such connection, one can correspond the physical model of the grating in three dimension and evaluate the EM radiation of the whole optical system rigorously.

Although such connection with the material birefringence, can be built with all the EM algorithm or analysis mentioned above, the computational expense of FDTD is extremely high for a complex system, which can place a huge hurdle to the system optimization, because any EM analysis solution acts as a kernel when the ray-tracing occurs each time, and the optimization of the whole system can run hundreds or thousands of ray-tracing simultaneously. The simulation time can grow exponentially.

In this aspect, the RCWA solution has unprecedented advantages of low computational expense.

To summarize, a rigorous RCWA algorithm is developed here that stem from the anisotropic material model (such as LC). It can calculate the EM radiation of multi-layer physical model. Furthermore, it is able to descript both planar and conical diffraction.

In an embodiment, the anisotropic RCWA disclosed herein starts from the precise description of the permittivity of anisotropic material, such as LC material. In the following, the general LC model is used as an example in the physics model, which allows the flexibility with/without the tilting effect. It should be understood by a person skilled in the art that although the LC material is used as an example to represent the anisotropic material, various embodiments are not limited to LC. The correspondence of permittivity and birefringence is universal for all materials including isotropic and anisotropic material. Therefore, various embodiments can be applied to isotropic/anisotropic material that imposes linear response to light.

In the following derivation, to simplify the description, several denomination principles are adopted. First, vectors are represented by symbol with arrow head, such as electric field $\vec{E}$. Second, matrices are represented by bold and non-italic symbol, such as matrix A. Third, tensors are expressed by double line head or tilt head, such as permittivity $\overline{\overline{\epsilon}}$ and $\tilde{\epsilon}$.

The following derivation is derived by assuming that the LC material has an ordinary index ($n_o$) and extraordinary index ($n_e$), and assuming that the LC grating has a slow axis polar angle of $\theta_c$ and an azimuth angle $\phi_c$. Here, as a reference, the nematic LC with no tilt is denoted as $\theta_c=90°$, and the azimuth angle $\phi_c$ is calculated from x-axis rotate to y-axis. As such, permittivity tensor can be written as:

$$\begin{bmatrix} \epsilon_{xx} & \epsilon_{xy} & \epsilon_{xz} \\ \epsilon_{yx} & \epsilon_{yy} & \epsilon_{yz} \\ \epsilon_{zx} & \epsilon_{zy} & \epsilon_{zz} \end{bmatrix} \qquad (1)$$

With a designated design requirement, such as wavelength, field of view and brightness and so on, a gauge mechanism can be built up to evaluate the diffraction efficiency of the liquid crystal based gratings and facilitate solution exploration of Multivariable space, such as grating thickness, slant angle and period.

The permittivity element can be related to the LC model as below:

$$\epsilon_{xx} = n_0^2 + (n_e^2 - n_0^2)\sin^2\theta_c\cos^2\phi_c \quad (2.1)$$

$$\epsilon_{xy} = \epsilon_{yx} = (n_e^2 - n_0^2)\sin^2\theta_c\sin\phi_c\cos\phi_c \quad (2.2)$$

$$\epsilon_{xz} = \epsilon_{zx} = \frac{n_e^2 - n_0^2}{2}\sin 2\theta_c\cos\phi_c \quad (2.3)$$

$$\epsilon_{yy} = n_0^2 + (n_e^2 - n_0^2)\sin^2\theta_c\sin^2\phi_c \quad (2.4)$$

$$\epsilon_{yz} = \epsilon_{zy} = \frac{n_e^2 - n_0^2}{2}\sin 2\theta_c\sin\phi_c \quad (2.5)$$

$$\epsilon_{zz} = n_0^2 + (n_e^2 - n_0^2)\cos^2\theta_c \quad (2.6)$$

In the above derivation, Fourier Series can be used to expand the terms with the slow axis azimuth angle $\phi_c$. Therefore, the permittivity can be written as following Fourier Series tensor:

$$\tilde{\epsilon} = \tilde{\epsilon}_0 + \tilde{\epsilon}_1 \quad (3.1)$$

$$\tilde{\epsilon}_0 = \begin{bmatrix} a\sin^2\theta_c + n_0^2 & 0 & 0 \\ 0 & a\sin^2\theta_c + n_0^2 & 0 \\ 0 & 0 & b \end{bmatrix} \quad (3.2)$$

$$\tilde{\epsilon}_1 = \begin{bmatrix} a\sin^2\theta_c\cos 2\phi_c & a\sin^2\theta_c\sin 2\phi_c & a\sin 2\theta_c\cos\phi_c \\ a\sin^2\theta_c\cos 2\phi_c & -a\cdot\sin^2\theta_c\sin 2\phi_c & a\sin 2\theta_c\cos\phi_c \\ a\sin 2\theta_c\cos\phi_c & a\sin 2\theta_c\sin\theta_c & a\cos 2\theta_c \end{bmatrix} \quad (3.3)$$

Further derive expand the cosine terms of azimuth angle $\phi_c$ into exponential terms, the term $\tilde{\epsilon}_1$ can be written as:

$$\tilde{\epsilon}_1 = \tilde{\epsilon}_1' + \tilde{\epsilon}_1'' + \tilde{\epsilon}_1''' \quad (4.1)$$

$$\tilde{\epsilon}_1' = \frac{a\sin^2\theta_c}{2}\begin{bmatrix} 1 & -j & 0 \\ -j & -1 & 0 \\ 0 & 0 & 0 \end{bmatrix}e^{j2\phi(x)} + \frac{a\sin^2\theta_c}{2}\begin{bmatrix} 1 & j & 0 \\ j & -1 & 0 \\ 0 & 0 & 0 \end{bmatrix}e^{-j2\phi(x)} \quad (4.2)$$

$$\tilde{\epsilon}_1'' = a\sin 2\theta_c\begin{bmatrix} 0 & 0 & 1 \\ 0 & 0 & -j \\ 1 & -j & 0 \end{bmatrix}e^{j\phi(x)} + a\sin 2\theta_c\begin{bmatrix} 0 & 0 & 1 \\ 0 & 0 & j \\ 1 & j & 0 \end{bmatrix}e^{-j\phi(x)} \quad (4.3)$$

$$\tilde{\epsilon}_1''' = a\cos 2\theta_c\begin{bmatrix} 0 & 0 & 0 \\ 0 & 0 & 0 \\ 0 & 0 & 1 \end{bmatrix}e^{j0\cdot\phi(x)} \quad (4.4)$$

When the LC model is perfectly nematic, i.e. no tilt and $\theta_c=90°$, the simplification can be obtained, so that the perturbation term of permittivity $\tilde{\epsilon}_1''$ is zero, and $\tilde{\epsilon}_1'''$ is constant. In this specific scenario, the geometric phase formed $\delta'_g$ by LC orientation $\phi(x)$ can be written as:

$$\delta'_g = 2\phi(x) \quad (5.1)$$

This geometric phase, $\delta'_g$, which is twice of the orientation angle, is a desired design result and can be used to form the phase on the grating surface. When the tilt of the liquid crystal molecule is not zero, other perturbation term of the permittivity $\tilde{\epsilon}_1''$ and $\tilde{\epsilon}_1'''$ are not zero, leading to fluctuation of EM field by variation of magnitude and phase. The term of $\tilde{\epsilon}_1''$ will be governed by $\delta''_g$, and $\tilde{\epsilon}_1'''$ will be governed by $\delta'''_g$:

$$\delta''_g = \phi(x) \quad (5.2)$$

$$\delta'''_g = 0\cdot\phi(x) \quad (5.3)$$

It can be seen that there may be two cases. One is that when $\theta_c=45°$, the permittivity $\tilde{\epsilon}$ has the largest proportion of term $\delta''_g$, suggesting the phase is determined largely by one time of the orientation $\phi(x)$. Another case is when $\theta_c=0°$, which is a c-plate structure, the geometric phase is zero, which means no phase variation will be created by the orientation of LC. Any case between these three cases, are the combination of the three terms of permittivity. Using the above Equations (2)-(5), a 3-by-3 permittivity tensor in Equation (1) can be obtained.

To evaluate the EM field of any structure, Maxwell equations can be the first step to start with. The Region 1, Region 2, and Region 3 are assumed as the input, grating, and output regions. The respective permittivity and permeability of these regions can be denoted as ($\epsilon_L$, $\mu_L$), with L=1, 2, 3 respectively. For nonmagnetic region, permeability thereof $\mu_L=1$. Maxwell equations applies:

$$\nabla\times\vec{S}_L = -j\mu\vec{U}_L \quad (6.1)$$

$$\nabla\times\vec{U}_L = -j\overline{\overline{\epsilon}}_L\vec{S}_L \quad (6.2)$$

where $\vec{S}_L = \vec{E}_L$, and $\vec{U}_L = \eta_0\vec{H}_L$, and $\eta_0 = \sqrt{\mu_0/\epsilon_0} = 377\Omega$. $\vec{E}_L$ is the electric field vector and $\vec{H}_L$ is the magnetic field vector. For Region L, the permittivity $\overline{\overline{\epsilon}}_L$ is a 3-by-3 tensor.

To include the information of wavevector $k_i=\hat{x}k_{xi}+\hat{y}k_{yi}+\hat{z}k_{zi}$ of ith order, the electric and magnetic field can be further written as:

$$\vec{S} = \Sigma_i^N[S_{xi}(z)\hat{x}+S_{yi}(z)\hat{y}+S_{yi}(z)\hat{z}]\exp(-j\phi_i) \quad (7.1)$$

$$\vec{U} = \Sigma_i^N[U_{xi}(z)\hat{x}+U_{yi}(z)\hat{y}+U_{yi}(z)\hat{z}]\exp(-j\phi_i) \quad (7.2)$$

$$\phi_i = k_{xi}x+k_{yi}y+ik_{zi}z \quad (7.3)$$

where i=−n, −(n−1), . . . , 0, 1, . . . , n−1, n. Here n is the order to be included in the RCWA, and N=2n+1 is the total order number.

Due to the permittivity tensor in Equation (6.2), the Maxwell Equations can be further expanded as follow:

$$\frac{\partial S_z}{\partial y} - \frac{\partial S_y}{\partial z} = -jU_x \quad (8.1)$$

$$-\left(\frac{\partial S_z}{\partial x} - \frac{\partial S_x}{\partial z}\right) = -jU_y \quad (8.2)$$

$$\frac{\partial S_y}{\partial x} - \frac{\partial S_x}{\partial y} = -jU_z \quad (8.3)$$

$$\frac{\partial U_z}{\partial y} - \frac{\partial U_y}{\partial z} = j(\epsilon_{xx}S_x + \epsilon_{xy}S_y + \epsilon_{xz}S_z) \quad (8.4)$$

$$-\left(\frac{\partial U_z}{\partial x} - \frac{\partial U_x}{\partial z}\right) = j(\epsilon_{yx}S_x + \epsilon_{yy}S_y + \epsilon_{yz}S_z) \quad (8.5)$$

$$\frac{\partial U_y}{\partial x} - \frac{\partial U_x}{\partial y} = j(\epsilon_{zx}S_x + \epsilon_{zy}S_y + \epsilon_{zz}S_z) \quad (8.6)$$

Using Equation (8), the following forms of partial differential equations in matrix form can be obtained:

$$\begin{bmatrix} \frac{\partial S_y}{\partial z} \\ \frac{\partial S_x}{\partial z} \\ \frac{\partial U_y}{\partial z} \\ \frac{\partial U_x}{\partial z} \end{bmatrix} = \begin{bmatrix} G_{11} & G_{12} & G_{13} & G_{14} \\ G_{21} & G_{22} & G_{23} & G_{24} \\ G_{31} & G_{32} & G_{33} & G_{34} \\ G_{41} & G_{42} & G_{43} & G_{44} \end{bmatrix}\begin{bmatrix} S_y \\ S_x \\ U_y \\ U_x \end{bmatrix} = G\cdot\begin{bmatrix} S_y \\ S_x \\ U_y \\ U_x \end{bmatrix} \quad (9)$$

From matrix G, the eigenvector $\omega_{i,m}$ and eigenvalue $q_{i,m}$ can be found, where m represents the mth eigenvector/eigenvalue, and i represents the ith diffraction order. Here, only one layer is considered. In the following, when an lth layer/sublayer is considered, a further subscript "l" will be used.

Using the state variable analysis, the EM field can be reconstructed by linear combination of eigenvector $\omega_{i,m}$ with eigenvalue $q_{i,m}$. Considering the boundary conditions between adjacent layers, for example, using the enhanced transmittance matrix ETM, the permittivity $\epsilon_l(x, z)$ of lth layer that include the LC model and the height of z can be expressed as:

$$\epsilon_l(x, z) = \sum_i \epsilon_{li}(x, z) \exp\left(\frac{j2\pi ix}{\Lambda} + \frac{j2h\phi_{lt}z}{d_l}\right) \quad (10.1)$$

$$D_l - d_l < z < D_l = \sum_{p=1}^{l} d_p \quad (10.2)$$

where $\phi_{lt}$ is the twist angle of lth layer, which has the thickness of $d_l$, and $D_l$ is the height of the layer. Using the Eq. (10.2) to plug into the state variables $[S_{l,y,i}, S_{l,x,i}, U_{l,y,i}, U_{l,x,i}]^T$ of lth layer calculated from Eq. (9), the state variables with ETM formulation can be found.

In this disclosure, the enhanced transmittance matrix ETM is incorporated into an anisotropic structure and is used to analyze the boundary conditions between adjacent layers of a grating, rather than merely an incident surface.

The eigenvector of the state variables $[S_{l,y,i}, S_{l,x,i}, U_{l,y,i}, U_{l,x,i}]^T$, which we denote as $[\omega_{1,l,i,m}, \omega_{2,l,i,m}, \omega_{3,l,i,m}, \omega_{4,l,i,m}]$, can be found by solving Eq. (9) of lth layer. Further, we define the quantities of $\omega_{1,l,i,m}, \omega_{2,l,i,m}, \omega_{3,l,i,m}$, and $\omega_{4,l,i,m}$ as the elements of the matrices $W_l^I, W_l^{II}, W_l^{III}$, and $W_l^{IV}$.

If we consider the conical scenario, the incident electric field vector can be written as:

$$\vec{E}_{inc} = \vec{u} \exp\left[-jk_0 n_I(\sin\theta\cos\phi x + \sin\theta\sin\phi y + \cos\theta z)\right] \quad (11.1)$$

$$\vec{u}(\cos\psi\cos\theta\cos\phi - \sin\psi\sin\phi)\hat{x} + (\cos\psi\cos\theta\sin\phi - \sin\psi\sin\phi)\hat{y} - (\cos\psi\sin\theta)\hat{z} \quad (11.2)$$

where $\psi$ is the angle between the electric field vector and the plane of incidence. In the modulated region of layers/sublayers of the grating ($D_{l-1} < z < D_l$), the EM field within the lth layer can be further expressed as follow:

$$\vec{E}_{gl} = \sum_i [S_{x,l,i}(z)x + S_{y,l,i}(z)y + S_{z,l,i}(z)z] \times \exp[-j(k_{xi}x + k_y y)] \quad (11.3)$$

$$\vec{H}_{gl} = \quad (11.4)$$

$$-j\left(\frac{\epsilon_0}{\mu_0}\right)^{1/2} \sum_i [U_{x,l,i}(z)x + U_{y,l,i}(z)y + U_{z,l,i}(z)z] \times \exp[-j(k_{xi}x + k_y y)]$$

The above Equation (11) is then used to solve the Maxwell Equations for each layer. Finally, for the region 1 (0<z) and region 3 (z>d), where d being the total thickness of grating, the electric field is given by:

$$\vec{E}_1 = \vec{E}_{inc} + \Sigma_i \vec{R}_i \exp[-j(k_{xi}x + k_y y - k_{1,zi}z)] \quad (11.5)$$

$$\vec{E}_3 = \Sigma_i \vec{T}_i \exp\{-j[k_{xi}x + k_y y - k_{1,zi}(z - d)]\} \quad (11.6)$$

To include both the planar and conical diffraction, Boundary Conditions are modified to reflect the transverse electric (TE) and transverse magnetic (TM) polarization. Firstly, the Boundary Conditions between the first layer and the region 1 and the Boundary Conditions between the final layer and region 3 are dealt with. Through the Boundary Conditions of TE and TM of reflection, transmission for two interfaces (assuming the total layer number is L), eight equations can be obtained, which can be used compose the matrices of the following:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix} \begin{bmatrix} R_s \\ R_p \end{bmatrix} = F_1 \cdot C \quad (12.1)$$

$$F_L \cdot C = \begin{bmatrix} I & 0 \\ -jY_{II} & 0 \\ 0 & I \\ 0 & -jZ_{II} \end{bmatrix} \begin{bmatrix} T_s \\ T_p \end{bmatrix} \quad (12.2)$$

where matrix $F_1$ or $F_L$ represents a matrix function of 1th or Lth layer, which can include or is derived from part or all of the following vectors:

diagonal matrix $K_x$ with the i, i element being equal to $k_{xi}/k_0$, wherein $k_0 = 2\pi/\lambda$ is a wave vector of an incident wave with wavelength $\lambda$, $k_{xi}$ is a wave vector of x direction, x represents x direction, and i is a diffraction order, convolution permittivity matrix E formed by the permittivity harmonic components, with i,p element being equals to $\epsilon_{(i-p)}$, eigenvalue matrix $Q_l$ of lth layer formed by eigenvalue $q_{l,i,m}$, and eigen matrix $W_l$ of lth layer formed by eigenvector $\omega_{l,i,m}$.

Matrix C represents constant vector used to reconstruct the linear combination of the eigenvectors.

Finally, matrix $Y_I$, $Y_{II}$, $Z_I$, and $Z_{II}$ represents diagonal matrix with diagonal element $(k_{1,zi}/k_0)$, $(k_{2,zi}/k_0)$, $(k_{1,zi}/k_0 n_1^2)$, and $(k_{2,zi}/k_0 n_1^2)$ respectively, wherein $k_{1,zi}$ represents a wave vector of i diffraction order in z direction in region 1, and $k_{2,zi}$ represents a wave vector of i diffraction order in z direction in region 2.

Once the matrices $F_1$ and $F_L$ are found through the BCs in Eqs. (12), the similar conical Boundary Conditions can be applied through adjacent layers, i.e. the respective matrix $F_l$ of lth layer can be found. In this way, the planar ETM algorithm is able to be extended to conical diffraction by the following iteration:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix} \begin{bmatrix} R_s \\ R_p \end{bmatrix} =$$

$$\prod_{l=1}^{L} F_l \cdot (F'_l)^{-1} \begin{bmatrix} I & 0 \\ -jY_{II} & 0 \\ 0 & I \\ 0 & -jZ_{II} \end{bmatrix} \begin{bmatrix} T_s \\ T_p \end{bmatrix} \quad (13)$$

where matrix $F'_l$ can be found through the Boundary Conditions of each layer. To solve the matrix of Equation (13), the simplification method of full-solution approach or partial-solution approach can be applied.

In the following, several verification using algorithms to recreate several published results are provided.

In order to validate the liquid crystal model and the planar diffraction, the RCWA solution is to recreate the unslanted Bragg Polarization Grating and slanted Bragg Polarization Grating angular/wavelength response presented by Xiao Xiang et al (Xiang X, Escuti M J. Numerical analysis of Bragg regime polarization gratings by rigorous coupled-wave analysis. Pract Hologr XXXI Mater Appl. 2017; 10127 (April 2017):101270D. doi:10.1117/12.2258529) in FIG. 2. The index of incident medium and substrate is $n_1=1$ and $n_2=1.7$. The average index and birefringence are set as $n_{avg}=1.65$ and $\Delta n=0.2$, respectively at green wavelength 532 nm. This recreated contour of Bragg Polarization Grating manifests the correctness of left circular polarization model of chiral and non-chiral network, as well as the RCWA algorithm and ETM algorithm.

Figure 2:
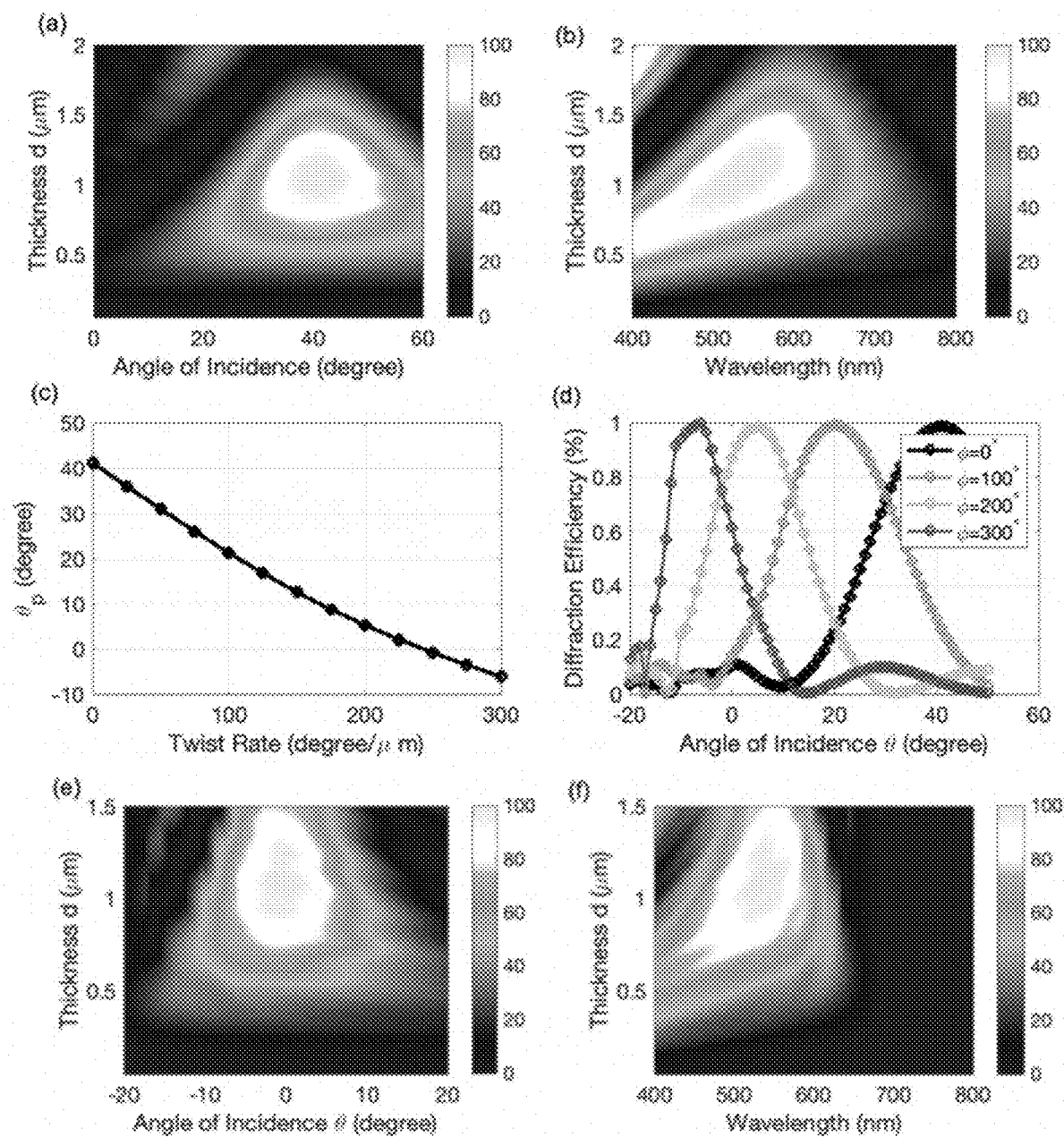
FIG. 2 shows schematic planar diffraction of Bragg polarization gratings according to an embodiment of this disclosure.

In the validation of planar diffraction of Bragg polarization grating shown in FIG. 2, FIG. 2 (a) shows diffraction efficiency varied by thickness and incident angle of 400 nm unslanted Bragg polarization grating with incident wavelength 532 nm; FIG. 2 (b) shows diffraction efficiency varied by thickness and wavelength of 400 nm unslanted PG at Bragg incident angle 42°; FIG. 2 (c) shows incident angle of slanted Bragg polarization grating with peak efficiency varied by twist rate; FIG. 2 (d) shows angular response of 1 µm Bragg polarization gratings with different twist rate; FIG. 2 (e) shows angular response varied by thickness of 400 nm slanted PG with incident wavelength 532 nm; and FIG. 2 (f) shows wavelength response varied by thickness of 400 nm slanted PG with incident wavelength 532 nm.

Figure 3:
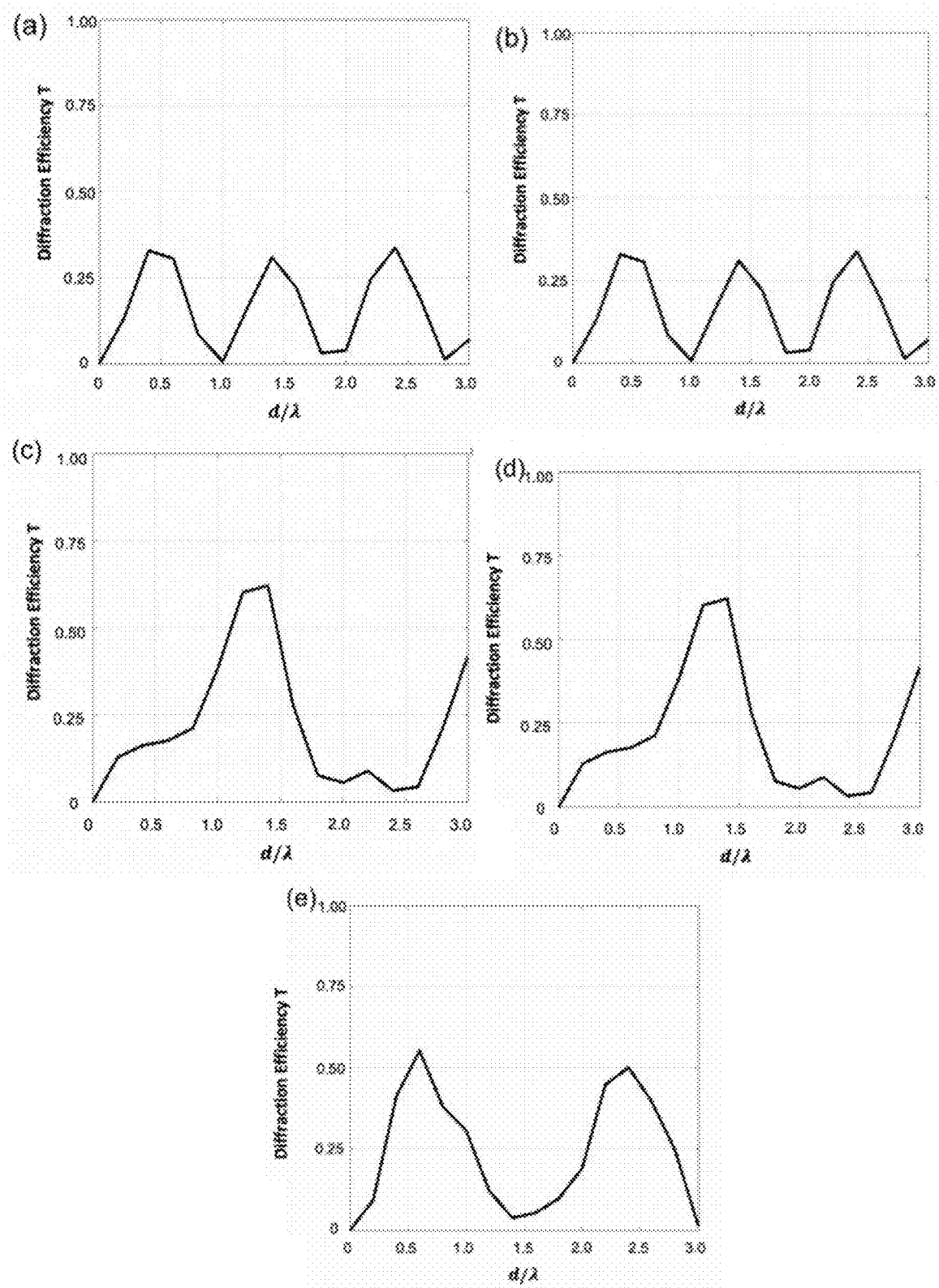
FIG. 3 shows schematic diffraction efficiencies on a normalized grating depth of a binary dielectric grating according to an embodiment of this disclosure.

FIG. 3 shows diffraction efficiency on the normalized grating depth of binary dielectric grating (grating index $n_2=2.04$, input media index $n_1=1$). In FIG. 3 (a), TE polarization, $\Lambda=10\lambda_0$, planar mount$(\theta,\phi)=(10°,0°)$. In FIG. 3 (b), TM polarization $\Lambda=10\lambda_0$, planar mount $(\theta,\phi)=(10°,0°)$. In FIG. 3 (c), TE polarization, $\Lambda=\lambda_0$, planar mount$(\theta, \phi)=(10°, 0°)$. In FIG. 3 (d), TM polarization, $\Lambda=\lambda_0$, planar mount$(\theta, \phi)=(10°,0°)$. In FIG. 3 (e), conical mount $(\theta,\phi)=(10°,30°)$. Polarization angle between the incident electric field and the plane of incidence $\psi=45°$.

Figure 4:
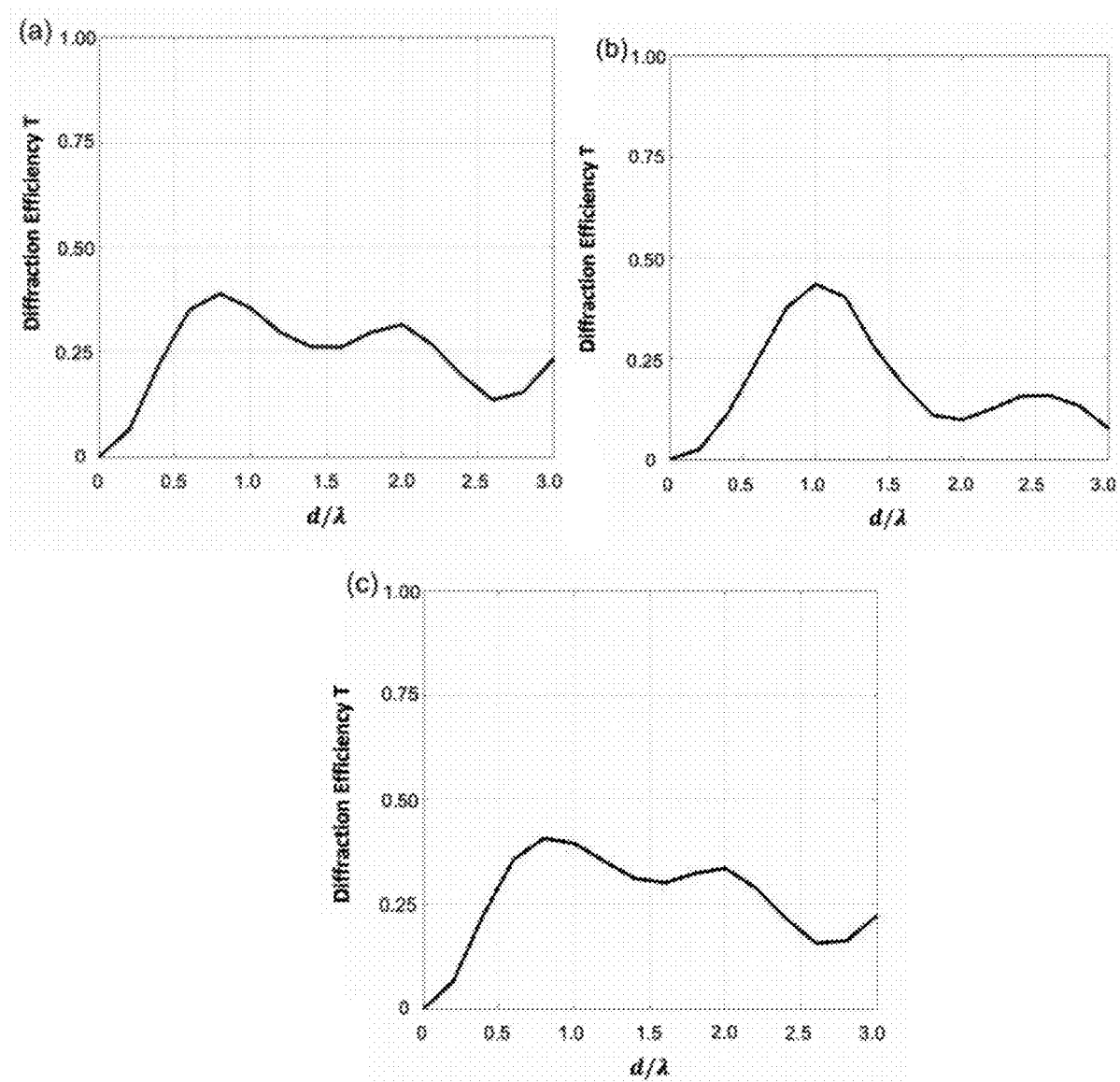
FIG. 4 shows schematic diffraction efficiencies on a normalized blazed grating of a 15-layers grating according to an embodiment of this disclosure.

FIG. 4 shows diffraction efficiency on the normalized blazed grating of 15 layers grating, with grating period, $\Lambda=\lambda_0$, (grating index $n_g=2.04$, input media index $n_0=1$). In FIG. 4 (a), TE polarization, planar mount $(\theta,\phi)=(10°,0°)$. In FIG. 4 (b) TM polarization, planar mount $(\theta,\phi)=(10°,0°)$. In FIG. 4 (c) conical $(\theta,\phi)=(10°,30°)$. Polarization angle between the incident electric field and the plane of incidence $\psi=45°$.

Figure 5:
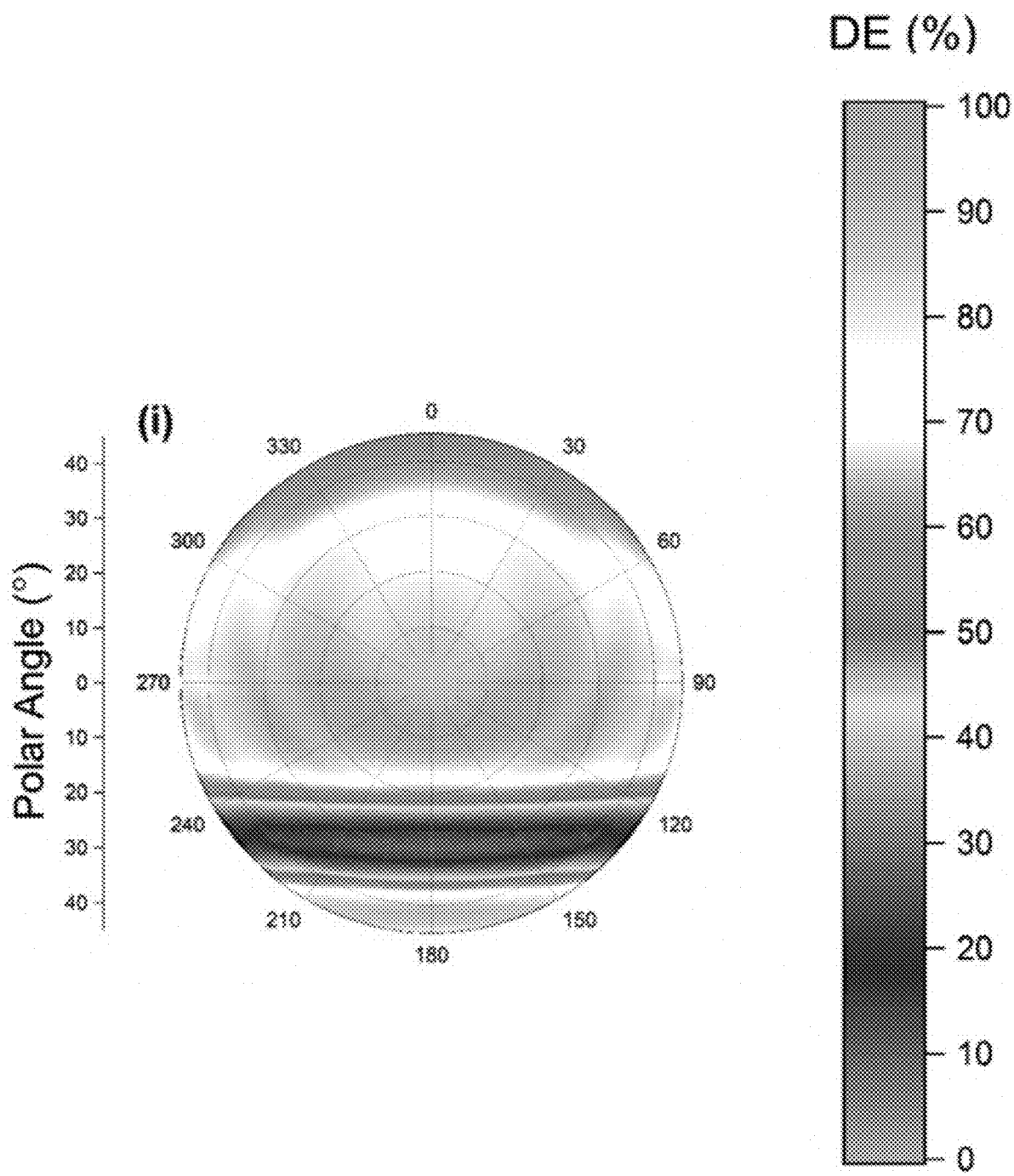
FIG. 5 shows schematic simulated diffraction e efficiency polar contour varied by wavelength of BY, GM and RC lens according to an embodiment of this disclosure.

In FIG. 5, the conical EMT algorithm with color-selected geometric phase lens design is validated. In this example, the conical diffraction of the respective colors in each type of BY, GM, RC lens show the correctness of the ETM conical RCWA algorithm. FIG. 5. Shows simulated diffraction efficiency polar contour varied by wavelength of color-selective geometric phase lens such as BY, GM, RC lens with left handedness circular input. In FIG. 5, (a)-(c) shows −1 order output; (d)-(f) shows 0 order output; and (g)-(i) shows 1 order output.

From FIG. 2-5, it can be seen that the solution proposed herein works well with various gratings.

Various embodiments of this disclosure base the rigorous coupled wave analysis (RCWA) algorithm on the anisotropic material (such as liquid crystal) property such as permittivity tensor and orientation on the substrate without any approximation or assumption of the physical properties. For example, by using the embodiments, the tilting effect of liquid crystal (LC) on the grating phenomenon can be calculated.

In addition, various embodiments with the RCWA algorithm solution can implement both enhanced transmittance matrix (ETM) algorithm to treat the boundary conditions and the conical diffraction on arbitrary plane of incidence.

Besides, in various embodiments, the correspondence of permittivity and birefringence is universal for materials including isotropic and anisotropic material. Therefore, various embodiment can be applied to isotropic/anisotropic material that impose linear response to light.

Various embodiments disclosed herein incorporate the conical RCWA, enhanced transmittance matrix (ETM) algorithm and based in the solid physics model (such as liquid crystal LC) material. So, various embodiments can enable great flexibility for the simulation of the diffraction phenomenon of multi-layer grating of anisotropic material. Furthermore, since embodiments are rooted in solid physics model of liquid crystal LC material, they can simulate any LC orientation, including nematic LC, cholesteric LC, and tilting effect to the grating phenomenon, allowing more design freedom for the LC-based grating element, which is beneficial for the AR/VR system design that based on LC-based elements such as Bragg volume gratings and geometric phase lens. In addition, solutions in various embodiments can be extended to two-dimension anisotropic grating by minimal modification of the wavevectors and the related parameters used in Maxwell equations. Therefore, its derivation thought by plugging the conical boundary conditions into the ETM is universal.

Figure 6:
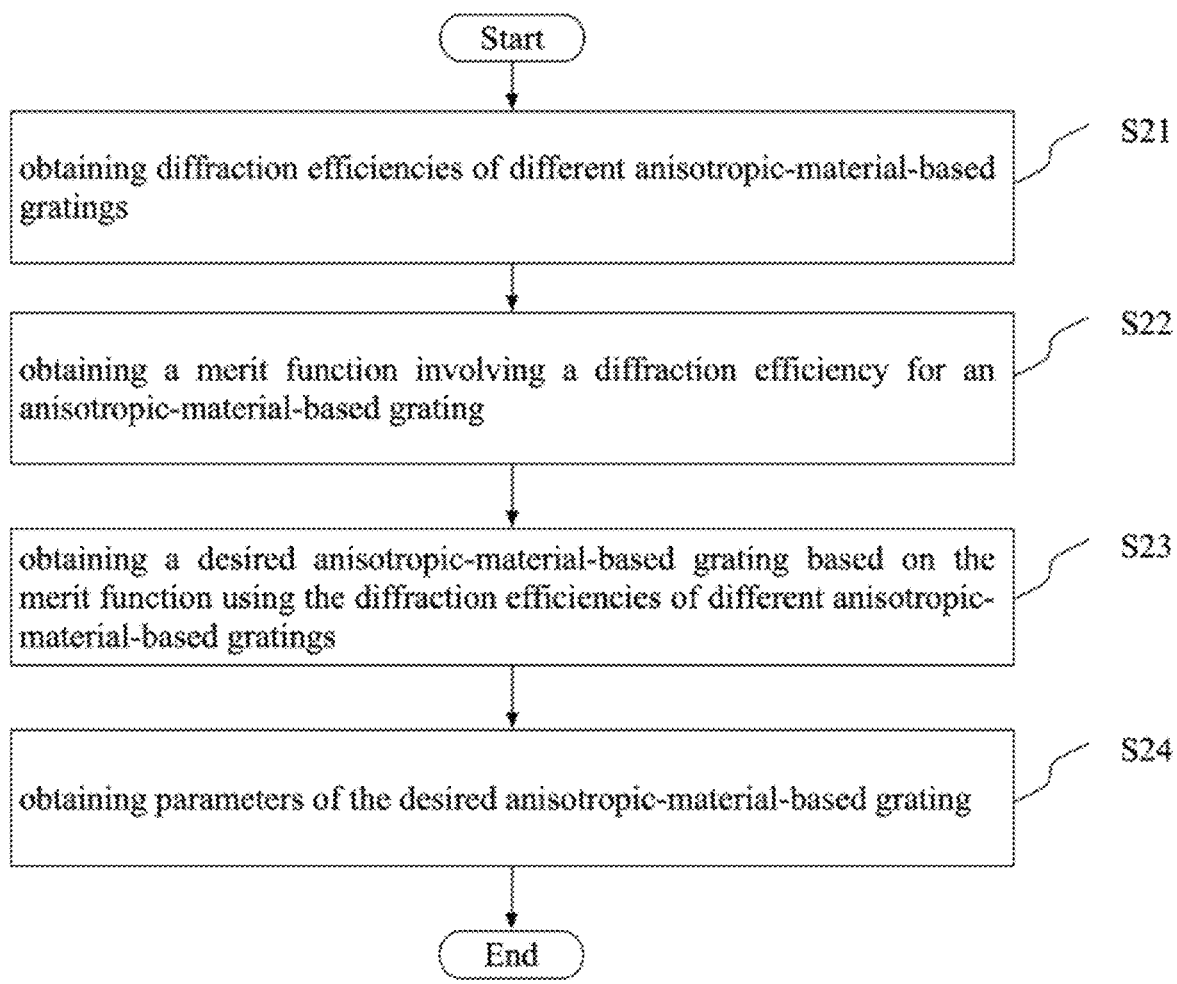
FIG. 6 shows a schematic flow chart of a method of obtaining parameters of an anisotropic-material-based grating according to an embodiment of this disclosure.

FIG. 6 shows a schematic flow chart of a method of obtaining parameters of an anisotropic-material-based grating according to an embodiment of this disclosure.

As shown in FIG. 6, in step S21, diffraction efficiencies of different anisotropic-material-based gratings are obtained by using the method of obtaining a diffraction efficiency of an anisotropic-material-based grating as described above.

In step S22, a merit function involving a diffraction efficiency for an anisotropic-material-based grating is obtained.

In step S23, a desired anisotropic-material-based grating is obtained based on the merit function using the diffraction efficiencies of different anisotropic-material-based gratings.

In step S24, parameters of the desired anisotropic-material-based grating are obtained.

By suing the method as described above, a designer can obtain a desired anisotropic-material-based grating.

Figure 7:
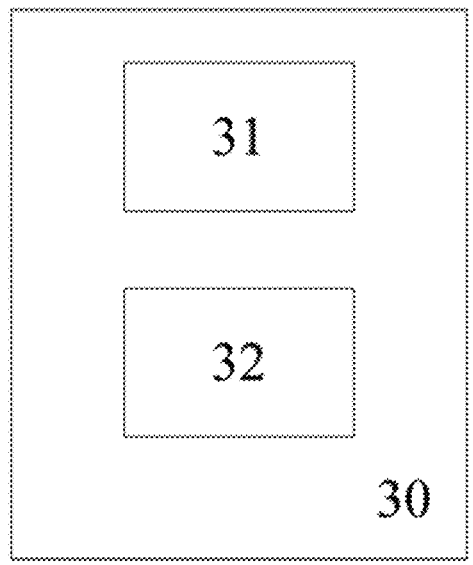
FIG. 7 shows a schematic block diagram of a computing device according to an embodiment of this disclosure.

FIG. 7 shows a schematic block diagram of a computing device according to an embodiment of this disclosure. As shown in FIG. 7, the computing device 30 comprises a memory 31 and a processing unit 32. The memory 31 includes executable instructions. When the executable instructions are executed by the processing unit 32, the processing unit 32 is made to implement the processes of the method obtaining a diffraction efficiency of an anisotropic-material-based grating as described above and/or the method of obtaining parameters of an anisotropic-material-based grating as described in FIG. 6.

By using the computing device as described above, a user can easily and accurately design desired gratings.

Figure 8:
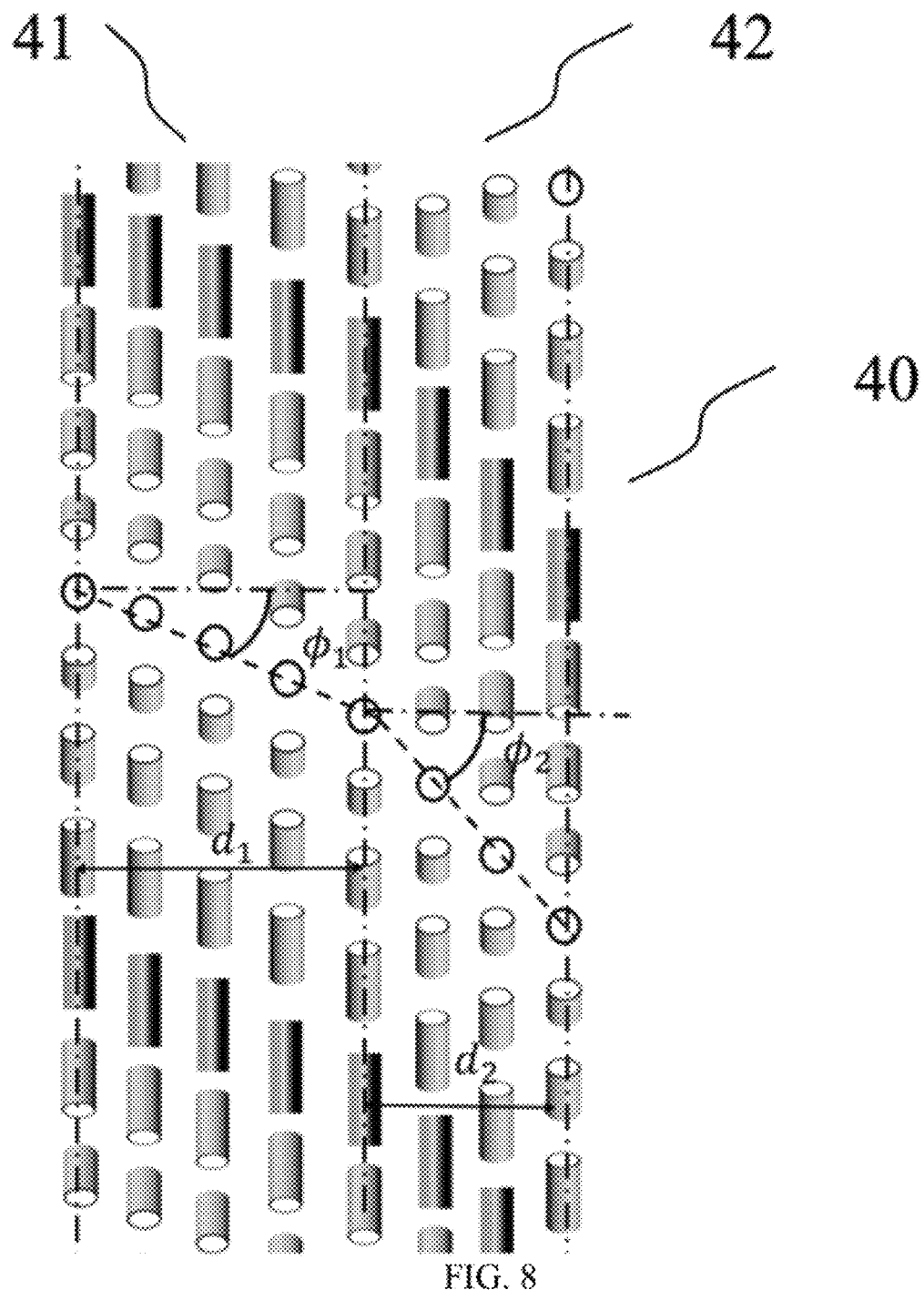
FIG. 8 shows a schematic diagram of an anisotropic-material-based grating according to an embodiment of this disclosure.

FIG. 8 shows a schematic diagram of an anisotropic-material-based grating according to an embodiment of this disclosure. For example, the anisotropic-material-based grating 40 is a liquid-crystal-based grating and has two sublayers 41, 42. The number of sublayers is just for illustration and will not limit the embodiment. Parameters of the anisotropic-material-based grating satisfy with those obtained by performing the method obtaining parameters of an anisotropic-material-based grating as described in FIG. 6, and/or such parameters can be obtained by running the computing device 30 as described in FIG. 7. For example, in FIG. 8, the thickness of the first sublayer 41 is $d_1$, and the azimuth angle of the first sublayer 41 is $\phi_1$. The thickness of the first sublayer 41 is $d_2$, and the azimuth angle of the first sublayer 41 is $\phi_2$.

Figure 9:
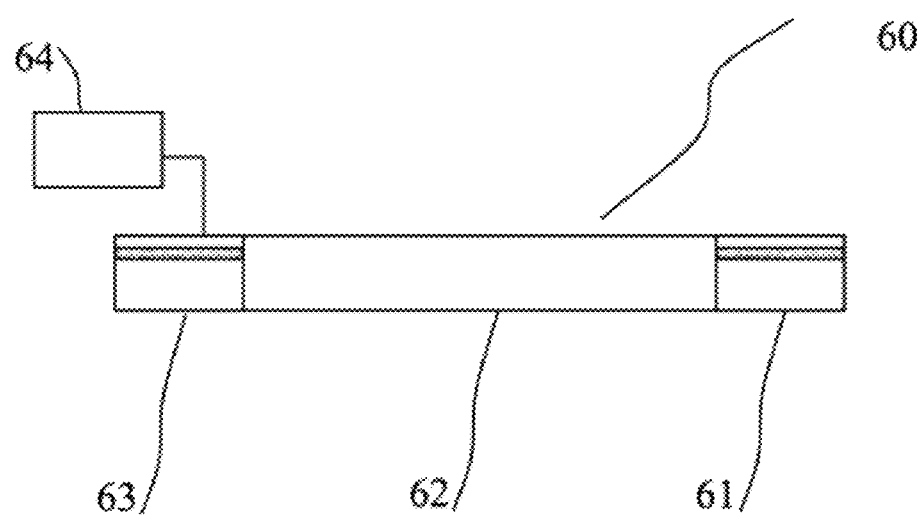
FIG. 9 shows a schematic diagram of an optical system according to an embodiment of this disclosure.

FIG. 9 shows a schematic diagram of an optical system according to an embodiment of this disclosure. The optical system 60 comprises: a waveguide 62; an input coupler grating 63, provided at input side of the waveguide 62 and coupling a light into the waveguide 62; and an output coupler grating 61, provided at output side of the waveguide 62 and coupling the light out of the waveguide 62. An image generating device 64 is provided to generate an image light. The image light is incident into the input coupler grating 63, travels in the waveguide 62 and is coupled out of the waveguide 62 by the output coupler grating 61. At least one of the input coupler grating 63 and the output coupler grating 63 is the liquid-crystal-based grating as described in FIG. 8.

Figure 10:
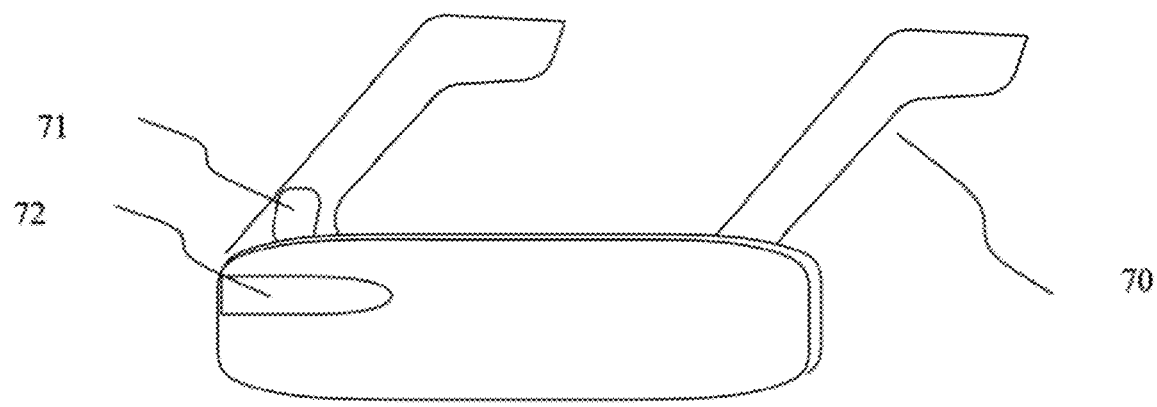
FIG. 10 shows a schematic diagram of an electronic device according to an embodiment of this disclosure.

FIG. 10 shows a schematic diagram of an electronic device according to an embodiment of this disclosure. For example, the electronic device 70 is an AR/VR glasses. The electronic device 70 comprises: a display 71, which generates an image light; and an optical waveguide system 72 as described above, which receives the image light.

Although some specific embodiments of the present invention have been demonstrated in detail with examples, it should be understood by a person skilled in the art that the above examples are only intended to be illustrative but not to limit the scope of the present disclosure.

What is claimed is:

1. A method of obtaining a diffraction efficiency of an anisotropic-material-based grating having at least two layers or sublayers in augmented reality (AR)/virtual reality (VR) devices, comprising:
   obtaining, by a processor, a target geometric phase $\delta'_g$ for the anisotropic-material-based grating;
   obtaining, by the processor, a slow axis azimuth angle $\phi_c(x)$ of the anisotropic-material-based grating according to the target geometric phase $\delta'_g$;
   obtaining, by the processor, a permittivity tensor of the anisotropic-material-based grating, wherein the anisotropic-material-based grating has an ordinary index n, and an extraordinary index ne, the anisotropic-material-based grating has a slow axis polar angle $\theta_c$ and slow axis azimuth angle $\phi_c(x)$, and the permittivity tensor is based on $n_o$, $n_e$, $\theta_c$ and $\phi_c(x)$;
   applying, by the processor, the permittivity tensor into Maxwell equations;
   obtaining, by the processor, electromagnetic field for the anisotropic-material-based grating by using boundary conditions of the at least two layers or sublayers of the anisotropic-material-based grating and Maxwell equations for each layer or sublayer, to obtain the diffraction efficiency for the anisotropic-material-based grating,
   determining if the at least two layers or sublayers are suitable to be integrated into one stack for an output coupler grating or an input coupler grating of a waveguide in the augmented reality/virtual reality devices based on the diffraction efficiency; and
   analysing the diffraction efficiency by a color dispersion and light control within the augmented reality/virtual reality devices.

2. The method according to claim 1, wherein obtaining electromagnetic field for the anisotropic-material-based grating by using boundary conditions of the at least two layers or sublayers of the anisotropic-material-based grating and Maxwell equations for each layer or sublayer further includes:

obtaining a matrix $F_1$ for a first layer or sublayer of the anisotropic-material-based grating by using a first boundary condition between the first layer or sublayer and a region 1 through a first equation as below:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix}\begin{bmatrix} R_s \\ R_p \end{bmatrix} = F_1 \cdot C$$

obtaining a matrix $F_L$ for a final layer or sublayer of the anisotropic-material-based grating by using a last boundary condition between the final layer or sublayer and a region 3 through a second equation as below:

$$F_L \cdot C = \begin{bmatrix} I & 0 \\ -jY_{II} & 0 \\ 0 & I \\ 0 & -jZ_{II} \end{bmatrix}\begin{bmatrix} T_s \\ T_p \end{bmatrix};$$

obtaining respective matrix $F_l$ of lth layer or sublayer by using respective boundary condition between adjacent layers or sublayers according to an iteration equation as below:

$$\begin{bmatrix} \sin\psi\delta_{i0} \\ j\sin\psi n_1\cos\theta\delta_{i0} \\ -j\cos\psi n_1\delta_{i0} \\ \cos\psi\cos\theta\delta_{i0} \end{bmatrix} + \begin{bmatrix} I & 0 \\ -jY_I & 0 \\ 0 & I \\ 0 & -jZ_I \end{bmatrix}\begin{bmatrix} R_s \\ R_p \end{bmatrix} =$$

$$\prod_{l=1}^{L} F_l \cdot (F'_l)^{-1} \begin{bmatrix} I & 0 \\ -jY_{II} & 0 \\ 0 & I \\ 0 & -jZ_{II} \end{bmatrix}\begin{bmatrix} T_s \\ T_p \end{bmatrix};$$

and obtaining electromagnetic field for the anisotropic-material-based grating by using boundary conditions obtained through the first, second equations, wherein region 1 is an input region for the anisotropic-material-based grating and region 3 is an output region for the anisotropic-material-based grating, wherein a total layer or sublayer number of the anisotropic-material-based grating is L, wherein matrix $F'_l$ is obtained through the boundary condition between layer/sublayer (l−1) and layer/sublayer l, wherein matrix $F_l$ represents a matrix function of lth layer or sublayer of the anisotropic-material-based grating, where l=1 . . . L, which can include or is derived from part or all of the following vectors: diagonal matrix $K_x$, convolution permittivity matrix E, eigenvalue matrix $Q_l$, and eigen matrix $W_l$, wherein the diagonal matrix $K_x$ has i, i element being equal to $k_{xi}/k_0$, $k_0$ is the incident wavevector $k_0=\hat{x}k_{x0}+\hat{y}k_{y0}+\hat{z}k_{z0}$, and $k_{xi}$ is the ith order wavevector in x axis in wavevector $k_i=\hat{x}k_{xi}+\hat{y}k_{yi}+\hat{z}k_{zi}$, wherein the convolution permittivity matrix E is formed by permittivity harmonic components, with i, p element being equals to a permittivity $\epsilon_{(i-p)}$, i represents ith diffraction order, and p represents pth layer/sublayer, wherein the eigenvalue matrix $Q_l$ is formed by eigenvalues $q_{l,i,m}$, wherein $q_{l,i,m}$ represents an mth eigenvalue of ith diffraction order in lth layer/sublayer, wherein the eigen matrix $W_l$ is formed by eigenvector $\omega_{l,i,m}$, wherein $w_{l,i,m}$ represents an mth eigenvector of ith diffraction order in lth layer/sublayer, wherein matrix I represents an identity matrix, wherein matrix C represents constant vector used to reconstruct the linear combination of the eigenvectors, wherein matrices $Y_I$, $Y_{II}$, $Z_I$, and $Z_{II}$ represent diagonal matrices with diagonal element $(k_{1,zi}/k_0)$, $(k_{2,zi}/k_0)$, $(k_{1,zi}/k_0 n_1^2)$, and $(k_{2,zi}/k_0 n_1^2)$, respectively, wherein $\psi$ is an angle between an electric field vector and a plane of incidence in region 1, $\delta_{i0}$ is a geometric phase in region 1, $n_1$ is an index of the region 1, and $\theta$ is a polar angle of the electric field vector in region 1.

3. The method according to claim 2, wherein the anisotropic-material-based grating is a liquid-crystal-based grating, and the sublayers of the liquid-crystal-based grating is formed through hologram in each layer of the liquid-crystal-based grating.

4. The method according to claim 2, wherein the ordinary index n, and the extraordinary index $n_e$ vary with a wave length of an incident light.

5. The method according to claim 1, wherein the anisotropic-material-based grating is a transmissive and/or reflective grating.

6. A method of obtaining parameters of an anisotropic-material-based grating, comprising:
   obtaining diffraction efficiencies of different anisotropic-material-based gratings by using the method according to claim 1;
   obtaining a merit function involving a diffraction efficiency for an anisotropic-material-based grating;
   obtaining a desired anisotropic-material-based grating based on the merit function using the diffraction efficiencies of different anisotropic-material-based gratings; and
   obtaining parameters of the desired anisotropic-material-based grating.

7. A computing device, comprising a non-transitory machine-readable memory and a processing unit, wherein the memory includes executable instructions, when the executable instructions are executed by the processing unit, the processing unit is made to implement the processes of the method according to claim 1.

* * * * *